US011576761B1

(12) United States Patent
Lam et al.

(10) Patent No.: US 11,576,761 B1
(45) Date of Patent: Feb. 14, 2023

(54) AUTOMATED DENTAL FLOSS DISPENSER AND DENTAL FLOSS CARTRIDGE FOR AN AUTOMATED DENTAL FLOSS DISPENSER

(71) Applicants: Giang Lam, Las Vegas, NV (US); Rex Edward Gabel, Las Vegas, NV (US)

(72) Inventors: Giang Lam, Las Vegas, NV (US); Rex Edward Gabel, Las Vegas, NV (US)

( * ) Notice: Subject to any disclaimer, the term of this patent is extended or adjusted under 35 U.S.C. 154(b) by 879 days.

(21) Appl. No.: 16/516,403

(22) Filed: Jul. 19, 2019

Related U.S. Application Data

(62) Division of application No. 15/459,382, filed on Mar. 15, 2017, now abandoned.

(60) Provisional application No. 62/309,047, filed on Mar. 16, 2016.

(51) Int. Cl.
*A61C 15/04* (2006.01)

(52) U.S. Cl.
CPC ............ *A61C 15/043* (2013.01); *A61C 15/04* (2013.01); *A61C 15/047* (2013.01)

(58) Field of Classification Search
CPC ..... A61C 15/04; A61C 15/043; A61C 15/047; B65H 51/10; B65H 51/12
See application file for complete search history.

(56) References Cited

U.S. PATENT DOCUMENTS

| | | | |
|---|---|---|---|
| 3,760,669 A * | 9/1973 | Rosenthal | B26D 1/205 83/204 |
| 4,245,658 A * | 1/1981 | Lecouturier | A61C 15/047 132/322 |
| 4,307,740 A * | 12/1981 | Florindez | A61C 15/047 132/322 |
| 4,458,702 A * | 7/1984 | Grollimund | A61C 15/047 433/29 |
| 4,508,239 A | 4/1985 | Rozzen | |
| 4,925,073 A | 5/1990 | Tarrson et al. | |
| 5,054,674 A | 10/1991 | Fortman | |
| 5,160,077 A | 11/1992 | Sticklin | |
| 5,217,031 A * | 6/1993 | Santoro | A61C 15/046 132/322 |

(Continued)

OTHER PUBLICATIONS

SMILEPRONTO | "Flosstime and Starter Cartridge—Smilepronto" website located at <https://smilepronto.com/collections/frontpage/products/flosstime> | printed on Mar. 18, 2019, date of first publication is unknown.

*Primary Examiner* — Nicholas D Lucchesi
*Assistant Examiner* — Jennifer Gill
(74) *Attorney, Agent, or Firm* — Hanrahan Law Firm, P.A.; Benjamin M. Hanrahan

(57) ABSTRACT

An automated, hands-free dental floss dispenser is provided herein. Particularly, the dispenser includes a housing and an activation sensor, such as an infrared, motion, or other sensor for detecting the presence of a hand or other object within a dental floss dispensing region and for activating the dispenser. The dispenser further includes a feeding assembly disposed at least partially within the housing, and a dispensing assembly for receiving an amount of dental floss from the feeding assembly. Specifically, the feeding assembly includes a removable and/or replaceable cartridge which at least temporarily retains the dental floss. The dispensing assembly includes a spindle and a spindle activation assembly, wherein the dental floss is fed from the feed assembly to the spindle for dispensing.

5 Claims, 24 Drawing Sheets

(56) References Cited

U.S. PATENT DOCUMENTS

| | | | |
|---|---|---|---|
| 5,282,563 A | | 2/1994 | Oliver et al. |
| 5,299,723 A | | 4/1994 | Hempel |
| 5,613,508 A | * | 3/1997 | Bushman .............. A61C 15/047 |
| | | | 132/325 |
| 5,645,206 A | * | 7/1997 | Ippisch ................ A61C 15/043 |
| | | | 225/10 |
| 6,047,712 A | | 4/2000 | Blades et al. |
| 8,695,469 B2 | * | 4/2014 | Webb .................... A61F 15/002 |
| | | | 83/225 |
| 10,376,345 B2 | * | 8/2019 | Evans .................. A61C 15/043 |
| 2005/0247328 A1 | | 11/2005 | Shen et al. |
| 2007/0277846 A1 | | 12/2007 | Chao |
| 2008/0257377 A1 | * | 10/2008 | Burrows ................ A61K 8/21 |
| | | | 132/324 |
| 2009/0127526 A1 | * | 5/2009 | Zaruba .................. B65H 51/10 |
| | | | 254/371 |
| 2010/0006119 A1 | * | 1/2010 | Veras .................. A61C 15/043 |
| | | | 132/325 |
| 2011/0284023 A1 | | 11/2011 | Borg et al. |
| 2013/0206162 A1 | | 8/2013 | Torres-Ortiz |
| 2013/0213432 A1 | | 8/2013 | Lee |
| 2016/0051351 A1 | | 2/2016 | Evans et al. |
| 2017/0172715 A1 | * | 6/2017 | Duong ................ A61C 15/043 |

\* cited by examiner

AUTOMATED DENTAL FLOSS DISPENSER AND DENTAL FLOSS CARTRIDGE FOR AN AUTOMATED DENTAL FLOSS DISPENSER

CLAIM OF PRIORITY/CROSS REFERENCE TO RELATED APPLICATION

The present application is divisional patent application of currently pending U.S. patent application Ser. No. 15/459,382 filed on Mar. 15, 2017, which is based on and claims priority to provisional patent application Ser. No. 62/309,047, filed on Mar. 16, 2016. The contents of both patent applications (Ser. No. 15/459,382 and 62/309,047) are incorporated herein in their entirety by reference.

FIELD OF THE INVENTION

The present invention is generally directed to an automated and/or hands-free dental floss dispensing assembly for the automatic or hands-free extraction, winding, and dispensing of an amount of dental floss. Some embodiments of the present invention are also directed to a dental floss cartridge adapted to at least temporarily retain an amount of dental floss and adapted for use with and extraction by an automated dental floss dispenser.

BACKGROUND OF THE INVENTION

Dental floss is used, or at least should be used, in the dental field on a daily basis, for example, in order to floss a patient's teeth during a visit to a dental office. Dental floss is also often used in a private setting or environment, for example, by a user or a consumer in his or her home as a basis of personal hygiene or as good practice when cleaning or brushing his or her own teeth.

Currently, the only known option for dispensing dental floss, for both a professional and private use, is a manual pull and pinch dispenser. In a dental office or other professional setting or environment, this type of dispenser often requires de-gloving by the operator (e.g., the dentist or dental assistant) during procedures, and manual manipulation of the dispenser and dental floss. This type of procedure can oftentimes cause cross contamination and transfer of the patient's oral fluids onto the dispenser or a portion of the dental floss remaining within the dispenser, thereby contaminating dispenser and/or the dental floss itself. The dispenser would then need to be de-contaminated with a spray or wipe—a process that is rarely performed and/or rarely effective.

Accordingly, there exists a need in the art for an at least partially hands-free or automatic dental floss dispenser that would allow a dental professional or other user or individual (whether in a dental office, at home, or otherwise) to acquire dental floss without de-gloving and/or without touching the dispenser. This would beneficially remove the issue of cross contamination, and in many cases, save procedural time and material for gloves, decontamination wipes and spray.

For commercial use, the proposed hand-free or automated dental floss dispenser may be used in hotels and/or in restaurants, for example. This can reinforce the importance of oral health and represent to the clients or customers that the business cares. It can also be used by commercial businesses (e.g., hotels and restaurants) to separate themselves from their competition by providing extra amenities.

For private or home use, the proposed hands-free or automated dental floss dispenser may be a continual reminder for the family members to floss—a procedure or step of oral hygiene that is often overlooked or forgotten. For instance, an aesthetically pleasing and easy-to-use device to dispense dental floss can be used to facilitate more use or regular use of dental floss, thereby increasing the overall oral health of the users within the family and community.

SUMMARY OF THE INVENTION

The present invention is generally directed to an automated dental floss dispenser which, when activated, will feed or dispense an amount of dental floss from a cartridge (or other dental floss source) through the dispenser for allowing a user to obtain the dental floss without touching the dispenser, with minimal touching of the dispenser, or in a hands-free or a substantially hands-free manner. In some embodiments, the amount of dental floss distributed or dispensed may be fixed or predetermined (e.g., in the range of approximately 30-40 centimeters), although in other embodiments, a user may be able to selectively control the amount or length of the dental floss, for example, by turning a dial or by providing a digital or other input.

For example, the dispenser may include a motion, infrared or other sensor that can detect the presence of a hand or other object, for example, placed in a designated location, for activating the dental floss dispenser. As an example, a user may place his or her hand under or within a floss receiving region which can signal to the device to begin dispensing an amount of dental floss. Other embodiments may allow manual activation by pressing a button, activating a switch, or waving a hand in front of a sensor, for example.

Upon activation, the dental floss dispenser of at least one exemplary embodiment will activate or turn on a motor causing an initial amount of dental floss to be extracted or pulled from a cartridge. In some embodiments, the cartridge may include an amount of dental floss for multiple uses, and can be removed and replaced, for example, when the dental floss is the cartridge is depleted or low. For example, the cartridge may include an amount of dental floss bunched, wound, or otherwise contained within a cartridge housing and which is fed or disposed through a nozzle or feed tube. On the inside of the cartridge, the dental floss may be wound about a spool that is rotationally disposed within the cartridge housing. When the dental floss is pulled from the nozzle or feed tube (e.g., via an external source of extraction), the spool will rotate within the cartridge housing, thereby facilitating extraction of the dental floss therefrom.

Furthermore, an initial amount of dental floss will be pulled or otherwise fed from the cartridge (e.g., from the nozzle or feed tube of the cartridge) via a dental floss feeding assembly, into a spindle assembly, where a pair of clamp pins or other like device(s) will function to engage or clamp the dental floss (e.g., proximate a first or leading end of the dental floss).

With the dental floss engaged or clamped, the spindle assembly is rotationally activated and, in some embodiments, to further extract or pull an amount of dental floss from the cartridge or other source. Upon doing so, in at least one embodiment, the dental floss may be at least partially wound around one or more winding pins and/or the clamp pins until a sufficient amount of dental floss is extracted.

A cut-off assembly may then be activated, which is structured to cut the dental floss, thereby separating the extracted dental floss from the cartridge or source. The operator or user can then place his or her hand under a sensor causing the dispenser to release the extracted dental floss, which can then fall to the user's hand by virtue of gravity. In some embodiments, due to the winding pin(s) and/or the rotational movement of the spindle, as the dental floss is pulled or extracted from the cartridge (or other source), the dental floss that is dispensed may be in the form of an at least partial coil, for example, instead of a long straight strand, that will be dropped into the user's hand. This coiled configuration of the dispensed dental floss can, in some cases, be useful to the user, in that it may be easier to grab and use for flossing than if the dispensed dental floss was a straight line or piece.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1A:
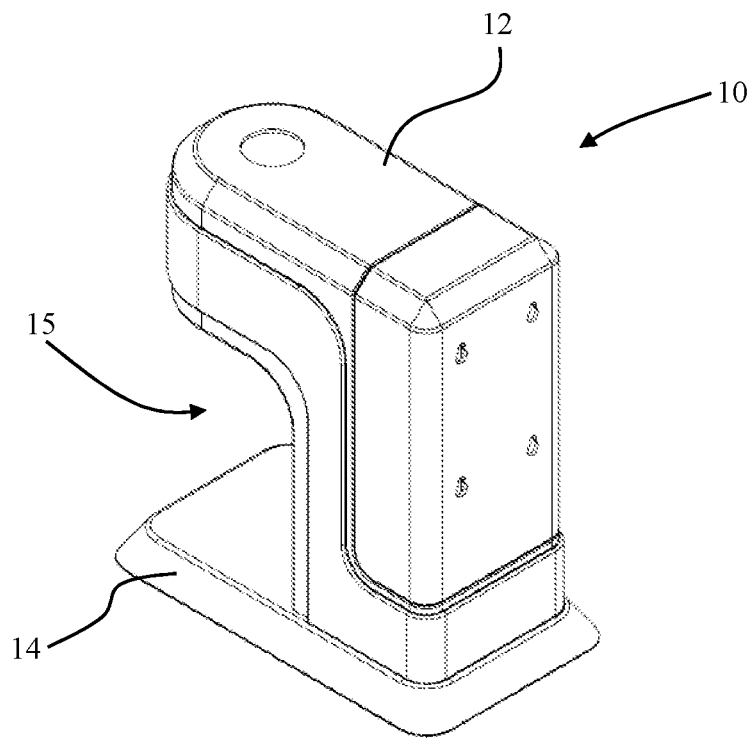
FIG. 1A is a rear perspective view of the dispenser/dispenser housing configured for desktop or countertop use as disclosed in accordance with at least one embodiment of the present invention.
Figure 1B:
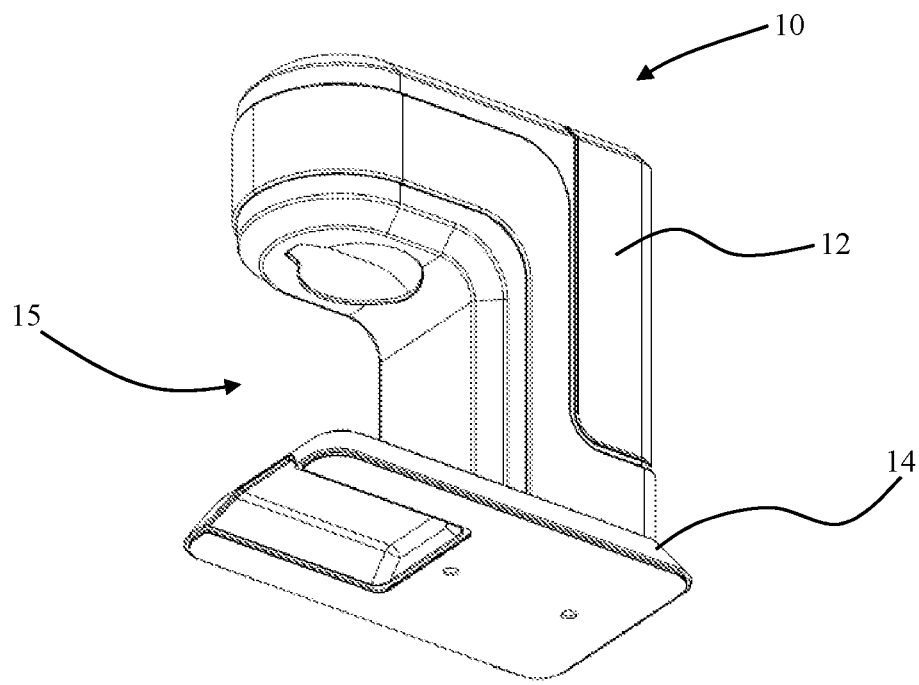
FIG. 1B is a front-bottom perspective view of the dispenser/dispenser housing as illustrated in FIG. 1A.
Figure 1C:
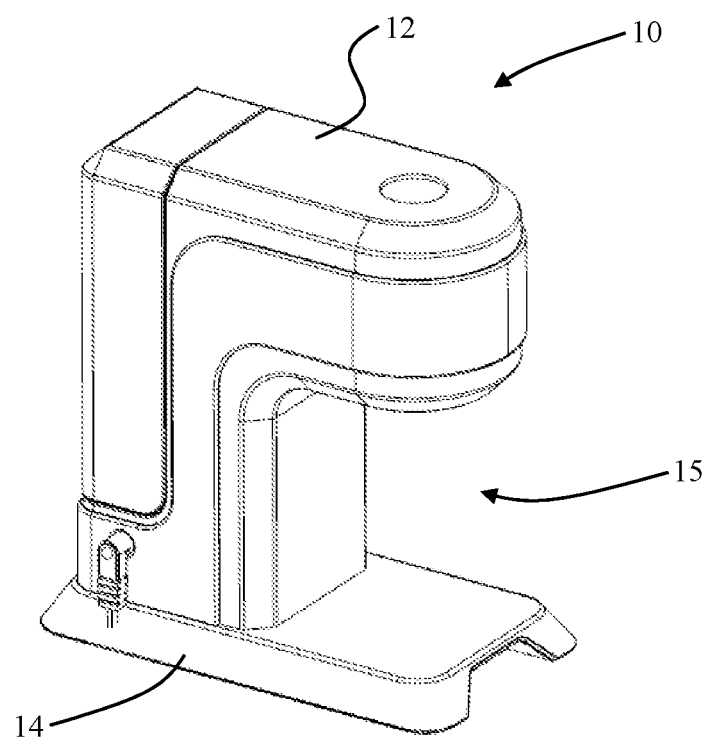
FIG. 1C is a front-left perspective view of the dispenser/dispenser housing as illustrated in FIGS. 1A and 1B.
Figure 1D:
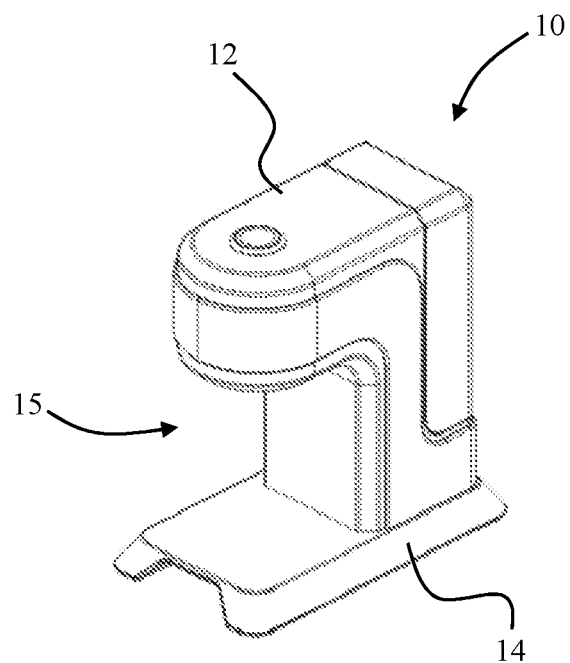
FIG. 1D is another front-perspective view of at least one embodiment of the dispenser/housing as disclosed herein.
Figure 1E:
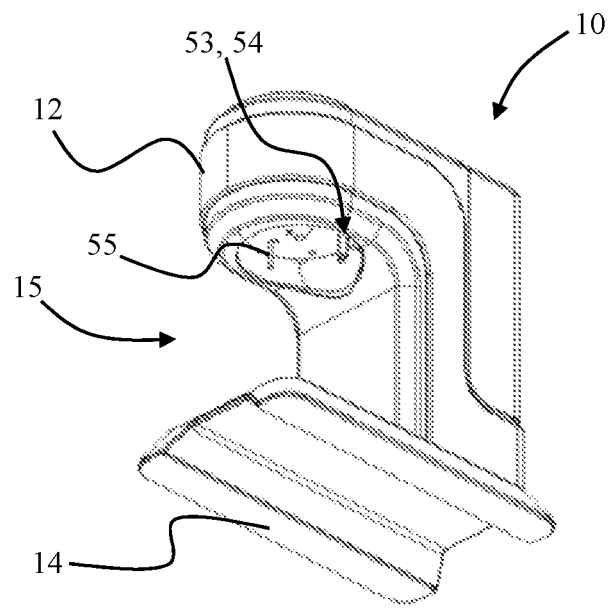
FIG. 1E is a bottom perspective view of the embodiment illustrated in FIG. 1D.
Figure 1F:
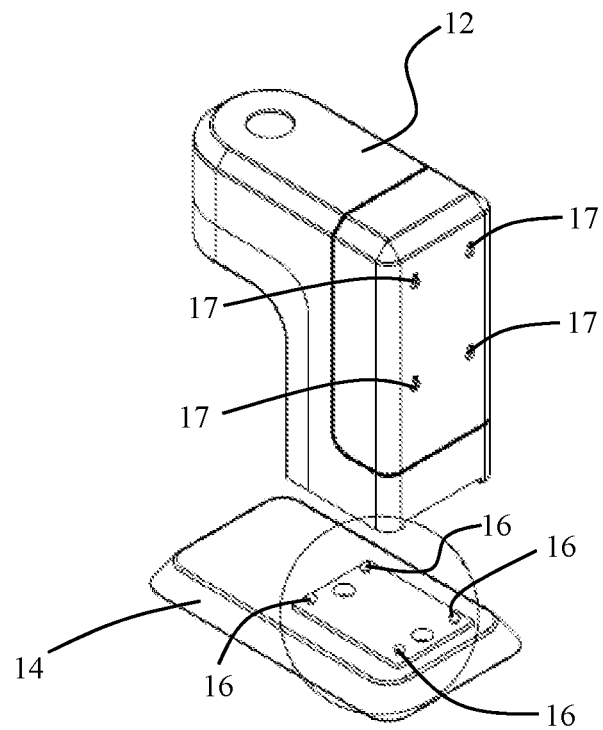
FIG. 1F is a partially exploded view of the dispenser/dispenser housing of at least one embodiment of the present invention.
Figure 1G:
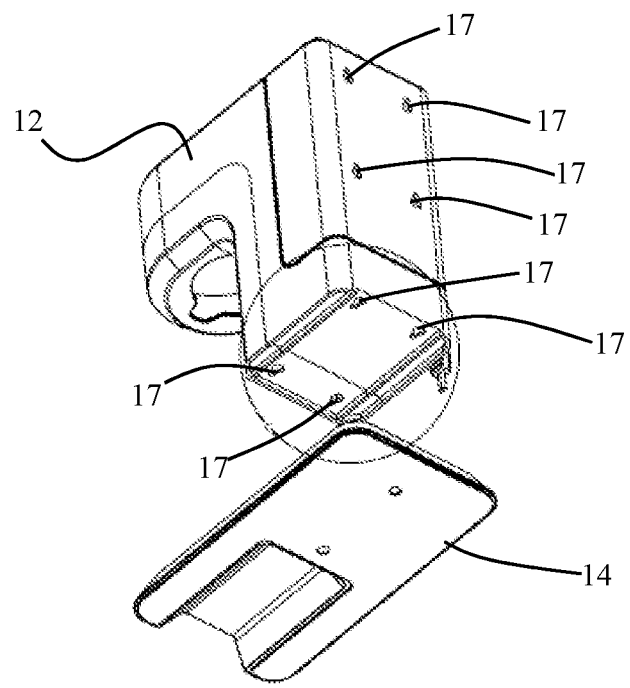
FIG. 1G is another partially exploded view of the dispenser/dispenser housing of the embodiment illustrated in FIG. 1D.

As shown in the accompanying drawings, and with particular reference to FIGS. 1A through 2C, the present invention is generally directed to an at least partially automated and/or hands-free dental floss dispenser, as shown by reference character 10. Particularly, the dental floss dispenser 10 of at least one embodiment includes a housing 12 defining an interior portion 13 where a number of components and/or structures are at least partially retained or otherwise disposed for the intended operation of the various embodiments of the present invention, as described herein.

Figure 2A:
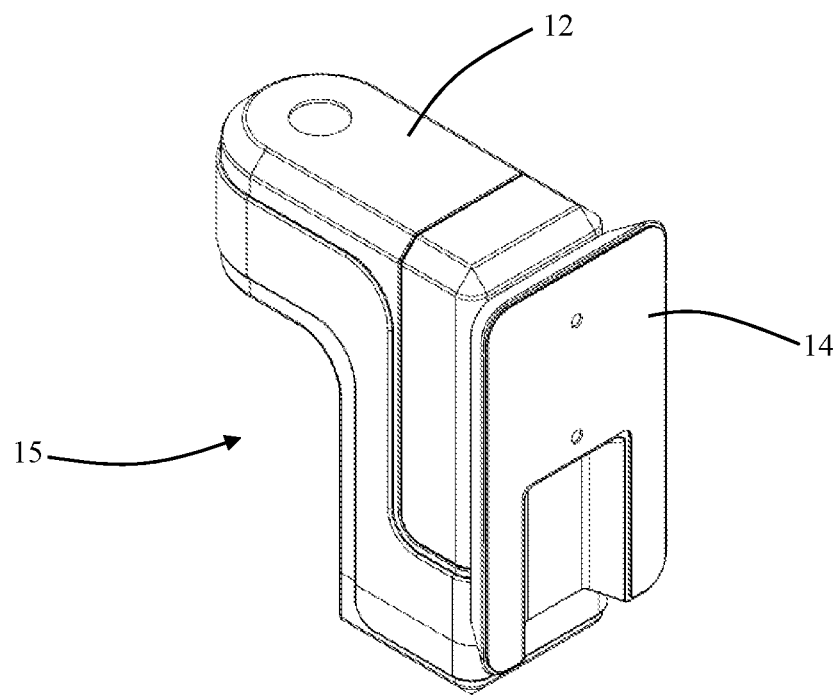
FIG. 2A is a rear perspective view of the dispenser/dispenser housing configured for wall-mount use as disclosed in accordance with at least one embodiment of the present invention.
Figure 2B:
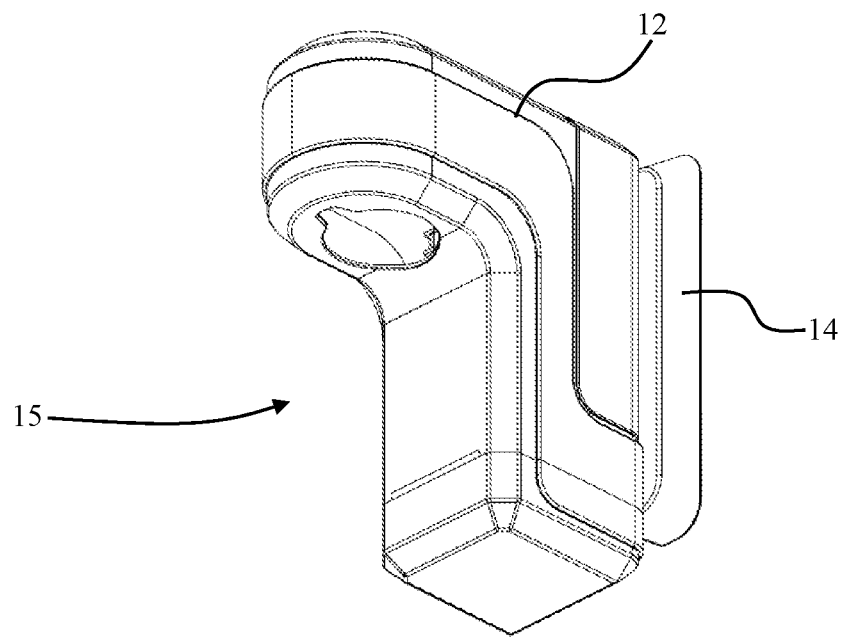
FIG. 2B is a front-bottom perspective view of the dispenser/dispenser housing as illustrated in FIG. 2A.
Figure 2C:
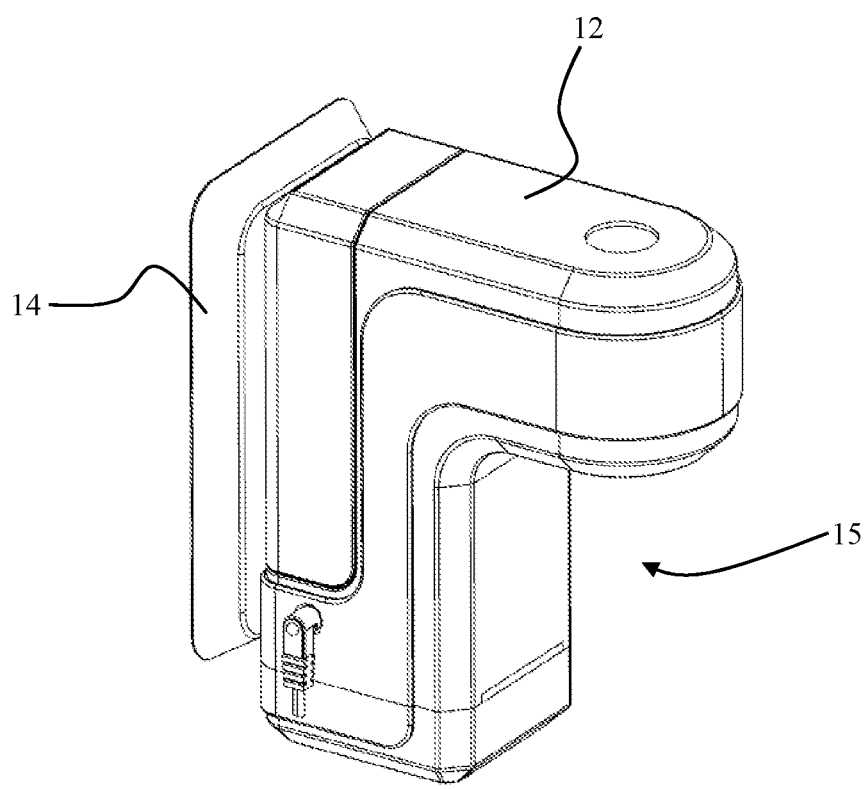
FIG. 2C is a front-left perspective view of the dispenser/dispenser housing as illustrated in FIGS. 2A and 2B.

Furthermore, as shown in FIGS. 1A through 1G, the housing of at least one embodiment may include or otherwise be attached to a base 14 for supporting the housing 12 on a generally horizontal surface, such as a desk, countertop, tabletop, etc. With reference to FIGS. 2A, 2B, and 2C, however, the base 14 or other like attachment member may be vertically oriented or otherwise mounted or connected (whether removably or fixedly) to a rear or side surface of the housing 12. This allows the housing 12 of the automated dental floss dispenser 10 of certain embodiments to be mounted or secured to a wall, cabinet, or other generally vertically oriented surface. For instance, the base 14 and the housing 12 of certain embodiments may include cooperatively structured and positioned studs 16 and slots 17 which allow the base 14 to be securely interconnected or attached to the main portion of the housing 12, for example at or near a bottom (FIGS. 1A through 1G) or at or near a rear (FIGS. 2A through 2C) or side for a vertical or wall mounted operation.

In any event, the housing 12 of certain embodiments may be configured to define a floss dispensing region 15 or area wherein an amount of dental floss may be dispensed, for instance, in an at least partially automated and/or hands-free manner. Accordingly, in some embodiments, a motion or other like sensor 19 (e.g., FIG. 4B) may detect the presence of a hand or other object within the floss dispensing region 15. Upon detecting the presence of a hand or other object, the automated or hands-free dental floss dispenser 10 may be configured to activate and operatively extract an amount of dental floss, for example, from a removable and/or refillable cartridge 20, and cut the dental floss for hands-free removal and dispensing. Other embodiments may have a switch, button or other activation sensor for turning on, activating or otherwise starting the dental floss extraction and dispensing, as disclosed herein.

Figure 3:
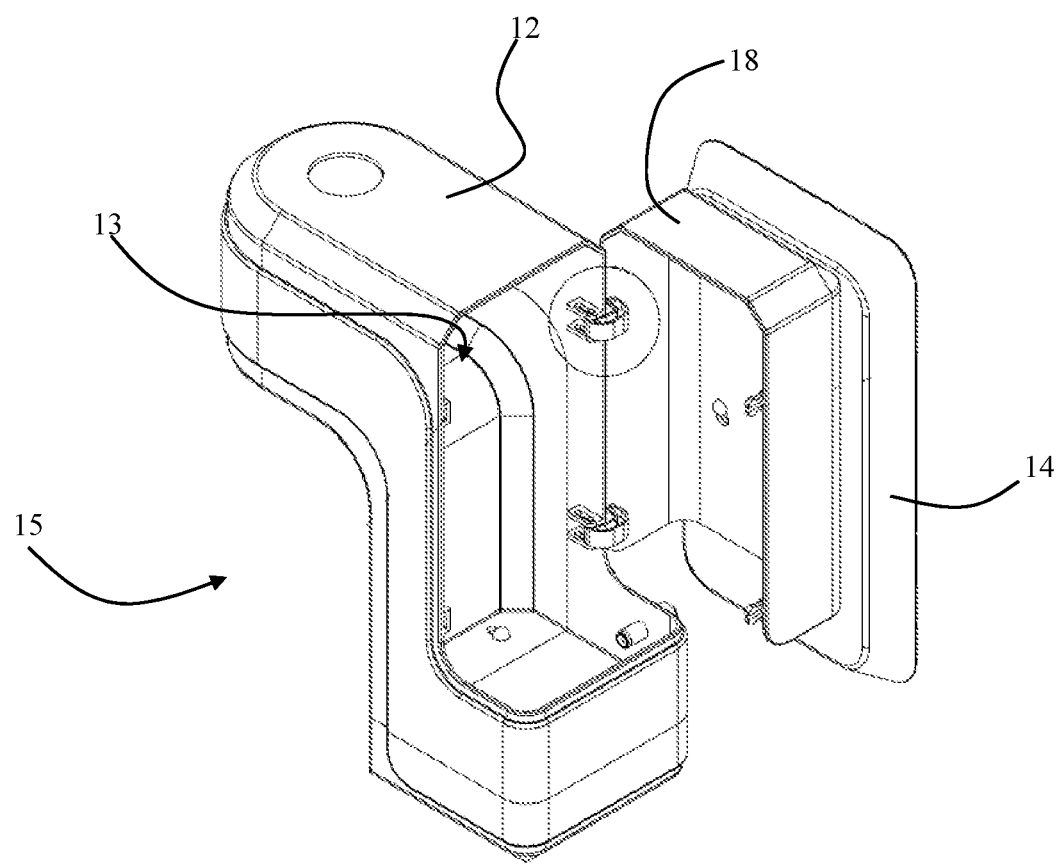
FIG. 3 is a rear perspective of the dispenser/dispenser housing with a rear access door open as disclosed in accordance with at least one embodiment of the present invention.

Furthermore, with reference now to FIG. 3, the housing 12 of at least one embodiment may include a hinged or other like door or opening 18 allowing access to at least a portion of the interior 13 thereof, for example, for loading and/or unloading a floss cartridge 20 (FIGS. 4A, and 5A through 5C). For example, the floss cartridge 20 of at least one embodiment is structured and adapted to retain an amount of dental floss therein and allow removal or extraction of the dental floss from the dispenser 10. In this regard, the cartridge 20 may connect, mount, or otherwise be disposed in an at least partially attached relation with dispenser 10, for example, with the housing 12, a feeding assembly 30, etc. Specifically, in some embodiments, the cartridge 20 may mount to a feeding assembly 30 disposed within the interior portion 13 of the housing 12, although it should be noted that in other embodiments the cartridge 20 may mount or connect to an external portion of the housing 12 or other location so long as the floss can be extracted from the cartridge 20 and fed into the dispenser 10 in order to facilitate implementation of the present invention in the intended manner.

For instance, the cartridge 20 may be removably disposed within the interior 13 of the housing 12, or otherwise interconnected, attached or mounted to or within the housing 12 (whether on the interior, exterior, or both) in a manner to allow extraction of dental floss contained therein, in accordance with the various embodiments described herein. Specifically, exemplary non-limiting cartridges 20 are illustrated in FIGS. 4A and 5A through 5C. Particularly, the cartridge 20 may include a cartridge housing 22 with an amount of dental floss 5 disposed therein. For instance, the cartridge 20 of at least one embodiment may include a floss spool 24 which contains the dental floss 5 wound therein or thereon in a manner to allow the smooth extraction from the cartridge 20, for instance, without being tangled, knotted, or otherwise obstructed. As show in FIG. 5C, for example, an amount of dental floss 5 is wound or wrapped about the external cylindrical surface of the spool 24. An end of the floss 5 will be fed through the opening 28 of the cartridge housing 22 and/or a corresponding nozzle 26 attached or mounted thereto.

In one embodiment, the spool 24 includes a cylindrical or round configuration with one or more protrusions or projections 25, for example, at opposite longitudinal ends, thereof. Those protrusions or projections 25 may fit or mount within corresponding mounting slots or holes 27, for example, on the inside portion of the housing 22. The one or more protrusions 25 and the corresponding mounting slots 27 are structured to allow the spool 24 to rotate within the housing 22 and facilitate the smooth extraction of dental floss 5 therefrom. More specifically, as the dental floss 5 is pulled or extracted from the cartridge 20, the spool 24 will freely rotate within the cartridge housing 22 allowing the dental floss to be easily extracted or unwound from the spool 24. As mentioned above, in some embodiments, a nozzle 26 or feed tube may be included on an outlet portion 28 of the cartridge 20, through which the floss 5 is threaded or routed for extraction in accordance with the present invention. In this manner, the nozzle 26 may include a channel or at least partially hollow opening through which the floss may be routed from the spool 24 or from inside the housing 22 and out into the floss disposer 10, and in particular, into a feeding assembly 30.

For instance, the cartridge 20 of the present invention acts or functions as a stable platform from which the floss 5 can be dispensed, pulled or fed into the dispenser 10. The cartridge 20 also keeps the floss 5 clean and out of the machine works until it is needed or extracted. Furthermore, the cartridge 30 allows the dispenser 20 to be easily used and can be replenished or replaced when the floss 5 is depleted from the cartridge 20. For example, when the floss 5 is low or depleted from the cartridge 20, the cartridge 20 can be easily removed, e.g. by opening the door and pulling the cartridge 20, although some embodiments may require unclipping or disengaging the cartridge in some manner. With the old, low or depleted cartridge removed, a new cartridge can be inserted into the machine or dispenser 20. It should be noted, however, that in some cases, the spool 24 may be replaced or replenished within the cartridge housing 22. In any event, the cartridge(s) 20 are specifically structured and designed to deliver the floss 5 from the cartridge 20 (e.g., from the nozzle 26 or opening 28) to a cooperatively structured or disposed feeding assembly 30 (e.g., feeding rollers) in a precise manner so the dispenser 10 will auto load the floss 5 when a new cartridge is installed.

Figure 6:
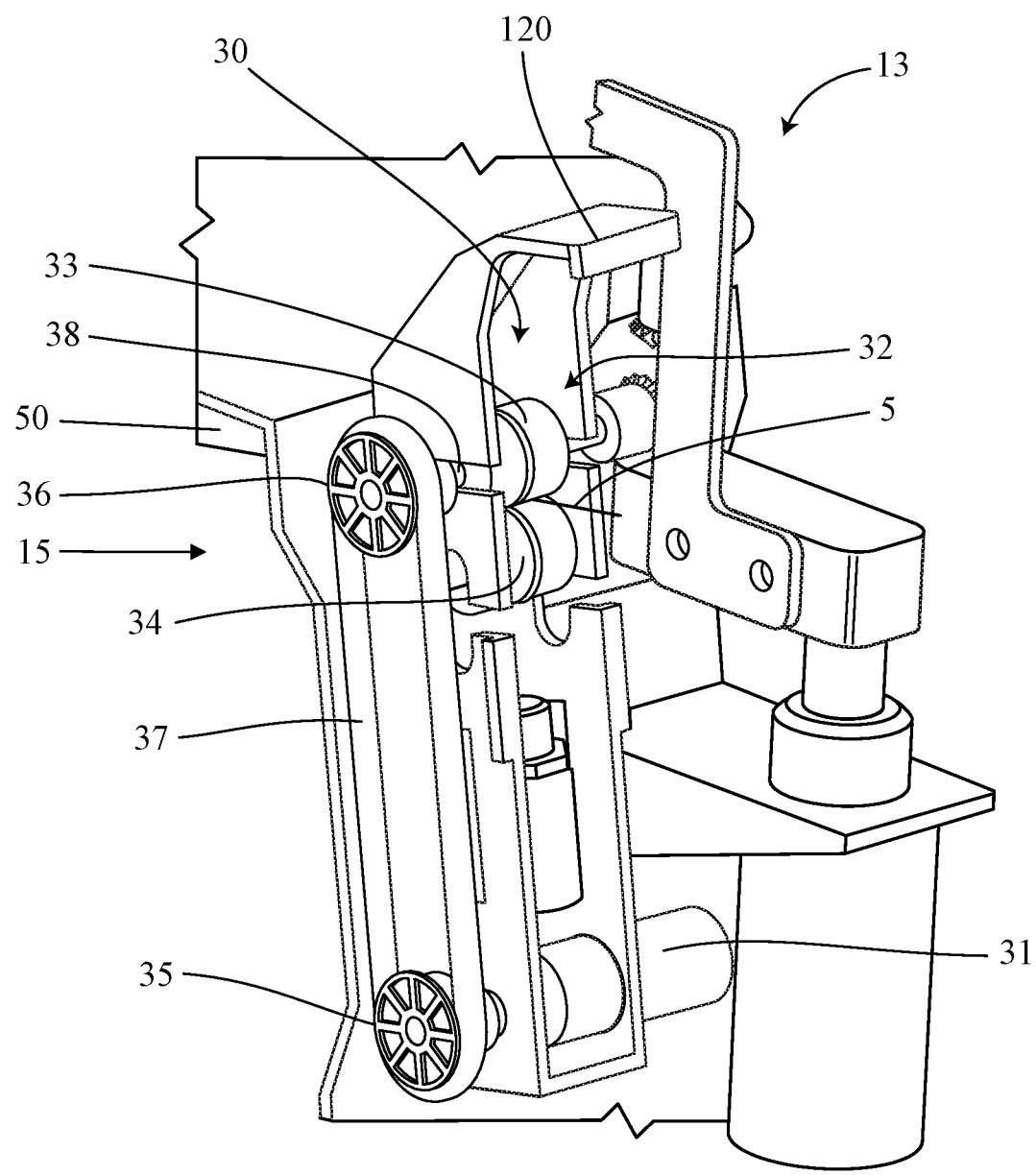
FIG. 6 is a partial internal view of the dental floss dispenser illustrating the dental floss feed assembly as disclosed in accordance with at least one embodiment of the present invention.

Specifically, turning now to the partial cut-away or internal view of the housing 12 of the automated dental floss dispenser 10 as illustrated in FIG. 6, for example, at least one embodiment of the present invention further includes a dental floss feeding assembly, generally referenced as 30. For purposes of clarity, the cartridge 20 is not illustrated in FIG. 6, although it should be noted that reference character 5 represents the dental floss that is extracted from the cartridge 20, for example, through the outlet or nozzle 26 (FIG. 4A and FIGS. 5A through 5C). Accordingly, in at least one embodiment, it should be noted that the nozzle 26 of the cartridge 20 may be disposed in an aligned relation with a portion of the dental floss feeding assembly 30, and in particular, as referenced by character 5 in FIG. 6. Further, in at least one embodiment, the feeding assembly 30 may include a cartridge mount 120, which can facilitate a removable connection or engagement with the cartridge 20. For example, the mount 120 may include an arm, lip or other attachment mechanism that is capable of or adapted to removably engage or connect to the cartridge 20. In the example illustrated, for instance in FIGS. 4B and 6, the cartridge mount 120 may engage, clip or contact a top, bottom or side portion of the cartridge 20, although other mounting structures are certainly contemplated within the full spirit and scope of the present invention.

Figure 4A:
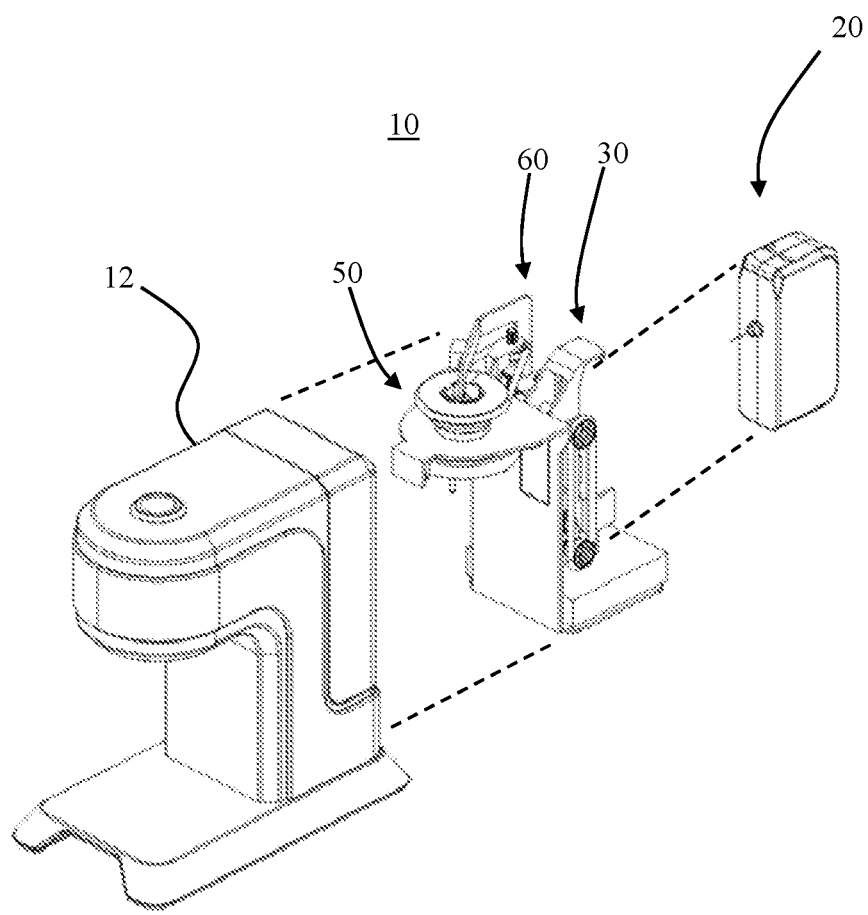
FIG. 4A is an at least partially exploded view of at least one embodiment of the dental floss dispenser as disclosed herein.
Figure 4B:
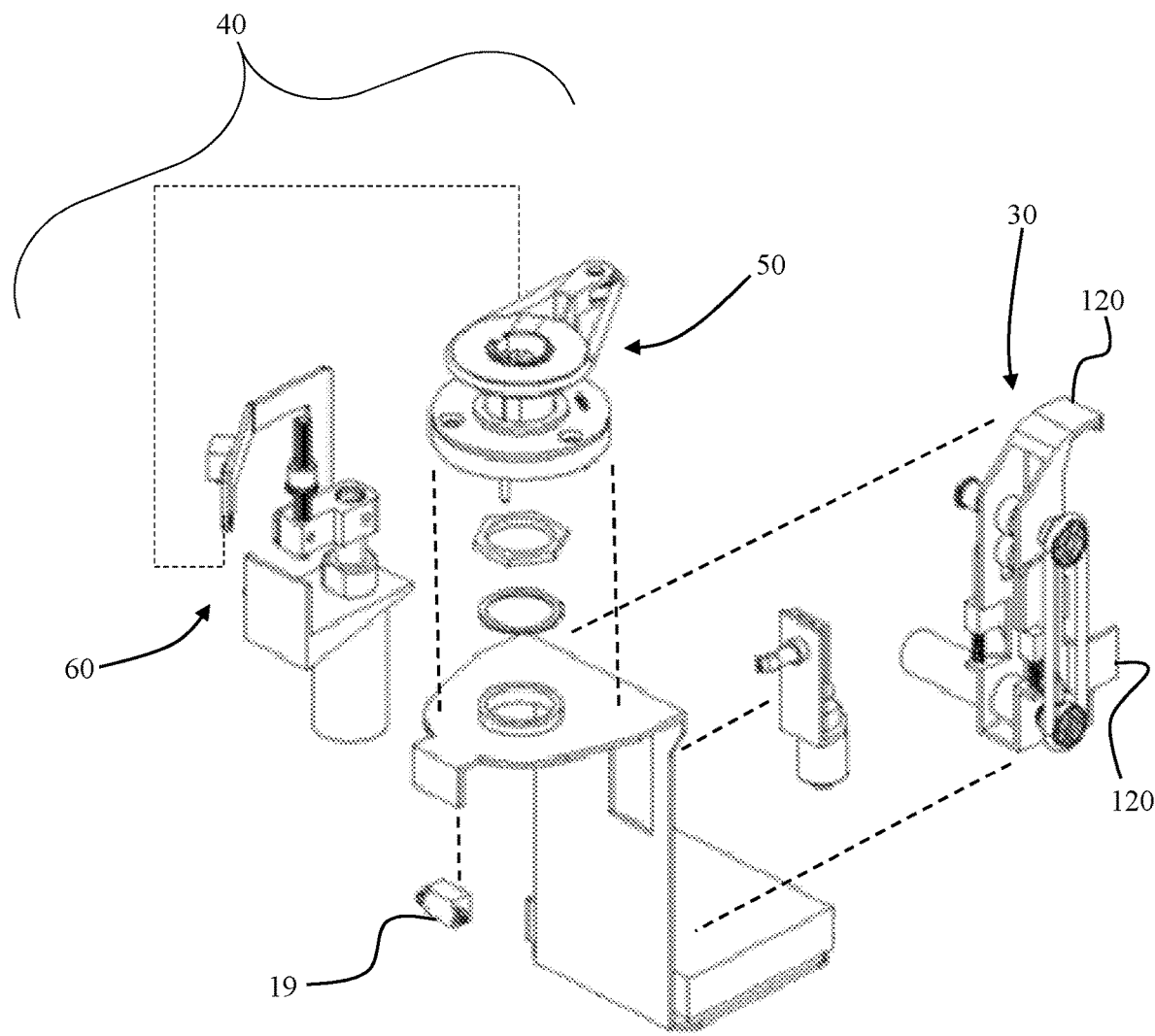
FIG. 4B is another at least partially exploded view illustrating the feeding assembly, spindle assembly and lift assembly of at least one embodiment.
Figure 4C:
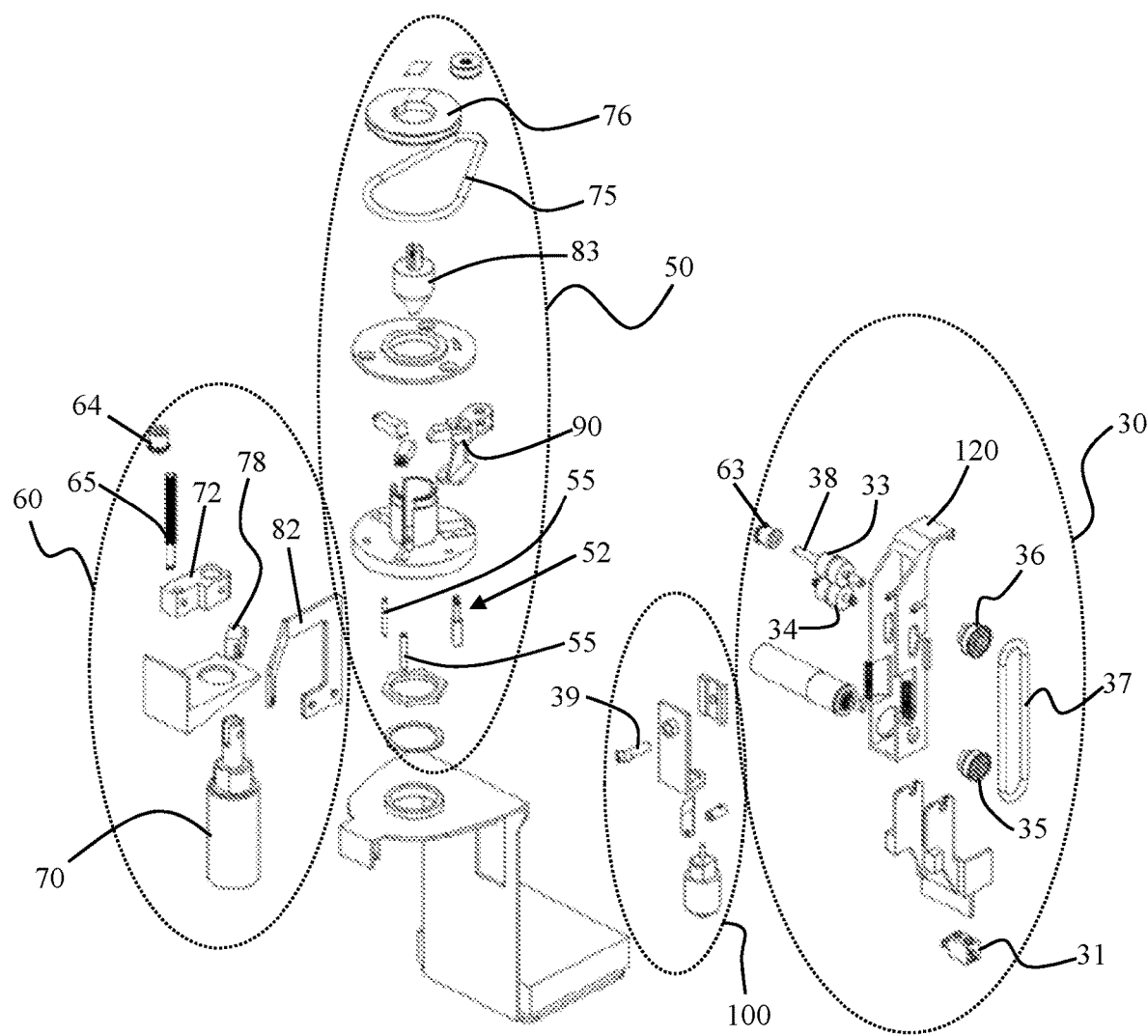
FIG. 4C is yet another exploded view illustrating the feeding assembly, spindle assembly and lift assembly of at least one embodiment.
Figure 5A:
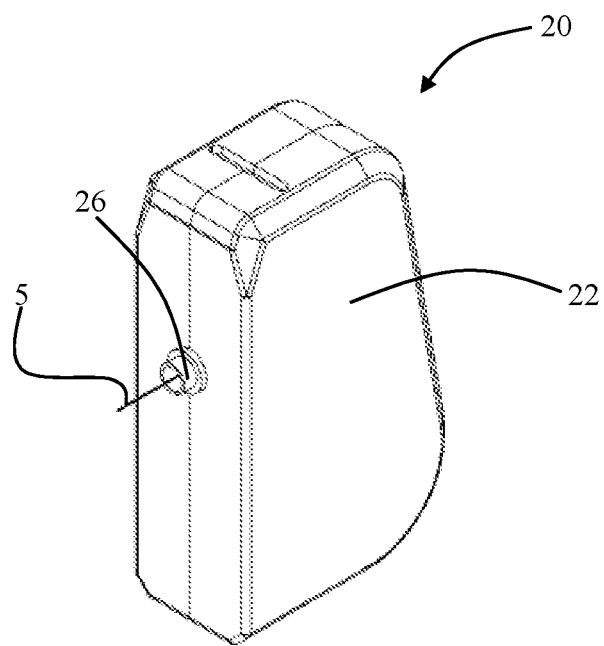
FIG. 5A is a perspective view of an exemplary dental floss cartridge as disclosed in accordance with at least one embodiment of the present invention.
Figure 5B:
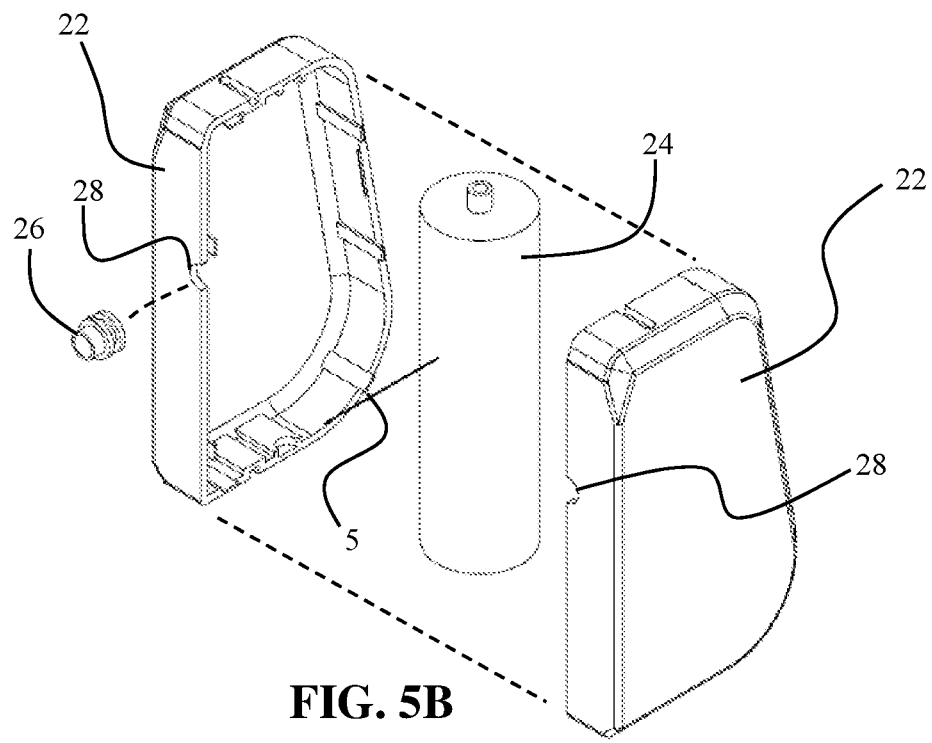
FIG. 5B is an exploded view of the exemplary dental floss cartridge illustrated in FIG. 5A.
Figure 5C:
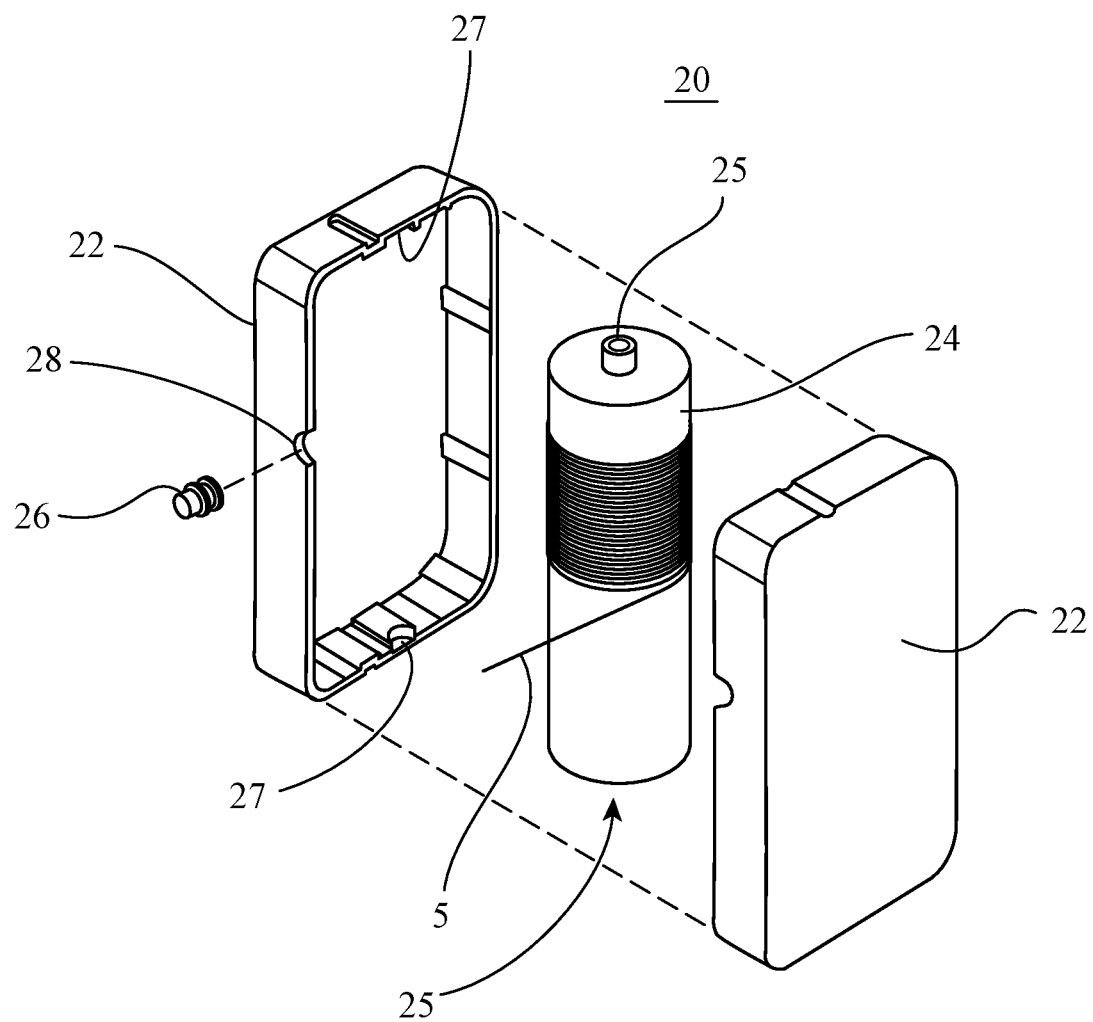
FIG. 5C is an exploded view of another exemplary dental floss cartridge as disclosed herein.
Figure 11:
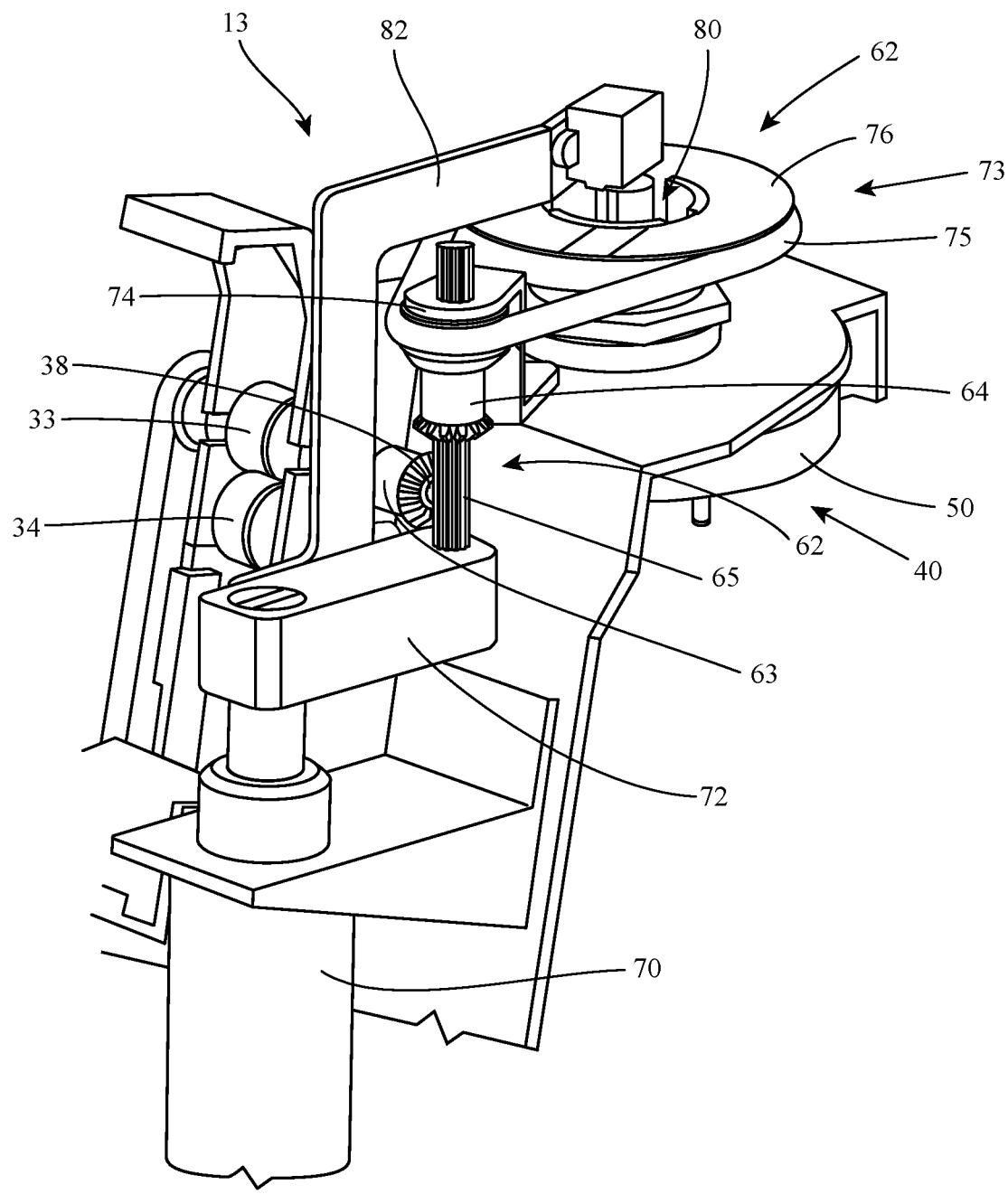
FIG. 11 is a partial internal view of the dispenser assembly illustrating the spindle activation assembly as disclosed in accordance with at least one embodiment of the present invention.

In any event, the dental floss feeding assembly 30 of the various embodiments is structured and disposed to extract an amount of dental floss 5, for example, from the cartridge 20, and feed the dental floss 5 to a dispensing assembly 40 (see, for example, FIGS. 4B and 11). For instance, the dental floss feeding assembly 30 of at least one embodiment includes a motor, generally referenced as 31, disposed in a driving relation to an extraction assembly 32. As shown in the embodiment of FIG. 6, the extraction assembly 32 may include one or more rollers 33, 34 disposed in a closely arranged relation to one another with substantially parallel axes of rotation. For instance, in the embodiment of FIG. 6, the rollers 33, 34 have rotational axes substantially parallel to one another, but substantially perpendicular to the direction of the extracted dental floss 5. In this manner, the dental floss 5 may be disposed or otherwise positioned between the rollers 33, 34, and due to the direction of travel or rotation of the rollers 33, 34 (e.g., away from the cartridge from a position between the rollers 33, 34), the dental floss 5 may be pulled, unraveled or otherwise extracted from the cartridge 20.

Still referring to FIG. 6, in operation, one embodiment of the dental floss feed assembly 30 may include a drive pulley 35 interconnected to or driven by the motor 31. When the motor 31 is activated, the drive whee/pulley 35 will be rotationally driven, and will, in turn, rotate a driven wheel/pulley 36 interconnected thereto, for example, via a drive belt 37 or other type of connection. At least one of the rollers 33, 34 may be connected to the same drive shaft 38 as the driven pulley 36, causing the roller 33, 34 to rotate as the driven pulley 36 rotates. As described above, as the roller(s) 33, 34 rotate, the dental floss 5 may be pulled or extracted from the cartridge 20 (not shown in FIG. 6). Of course, other dental floss feed assemblies 30 may be implemented within the full spirit and scope of the various embodiments of the present invention, in addition to or instead of the wheels/pulleys 35, 36, drive belt 37 and rollers 33, 34.

Figure 7:
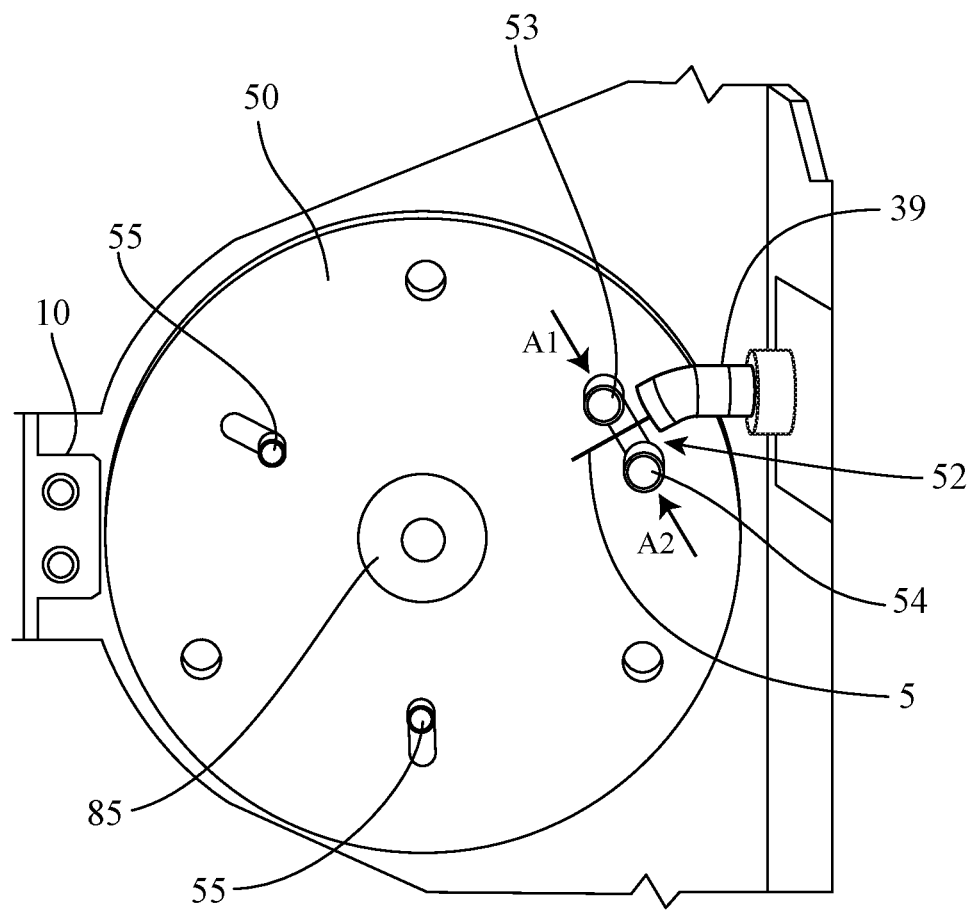
FIG. 7 is an upward view of the spindle assembly with the clamp pins disposed in a separated positioned as provided in accordance with at least one embodiment of the present invention.

Referring now to FIG. 7, an upward view from within the floss dispensing region 15 is illustrated, showing a bottom view of at least a portion of the dispensing assembly 40, such as a spindle assembly 50 and where the dental floss 5 exits the dental floss feeding assembly 30 via an exit tube 39. Specifically, as the feeding assembly 30 (FIG. 6) pulls or extracts dental floss 5 from the cartridge 20, the dental floss 5 is fed through tube 39 or otherwise fed into the dispensing assembly 40.

Figure 8:
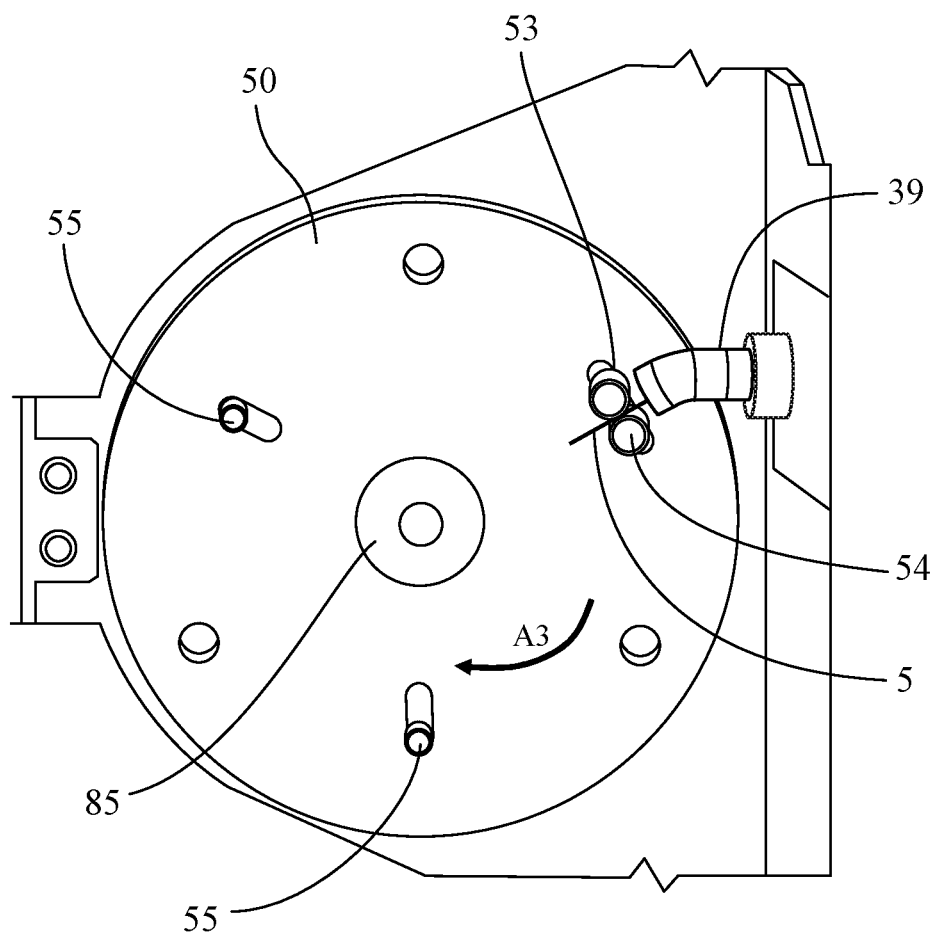
FIG. 8 is an upward view of the spindle assembly with the clamp pins disposed in a clamped or engaged position as provided in accordance with at least one embodiment of the present invention.
Figure 9:
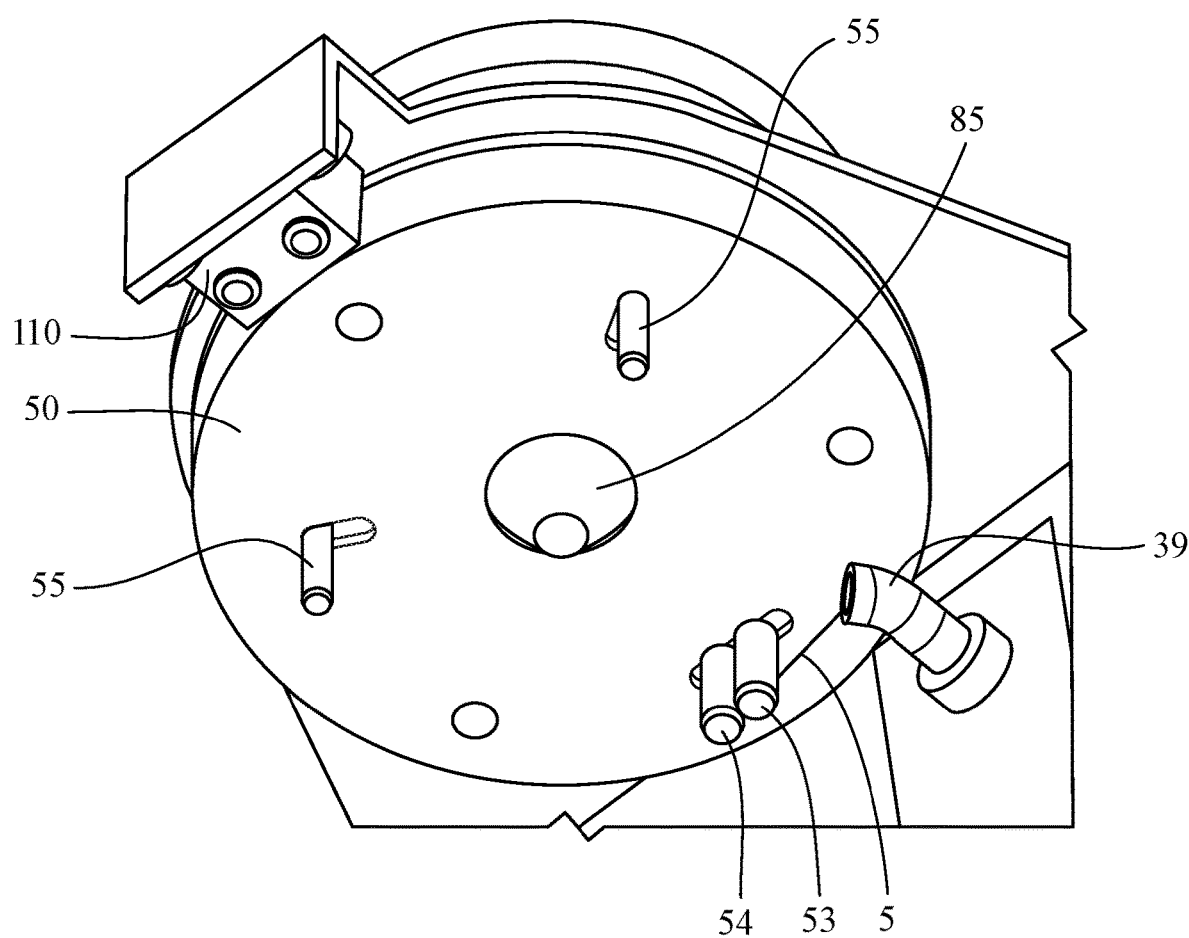
FIG. 9 is an upward perspective view of the spindle assembly at the initial stages of rotation as disclosed herein.
Figure 10:
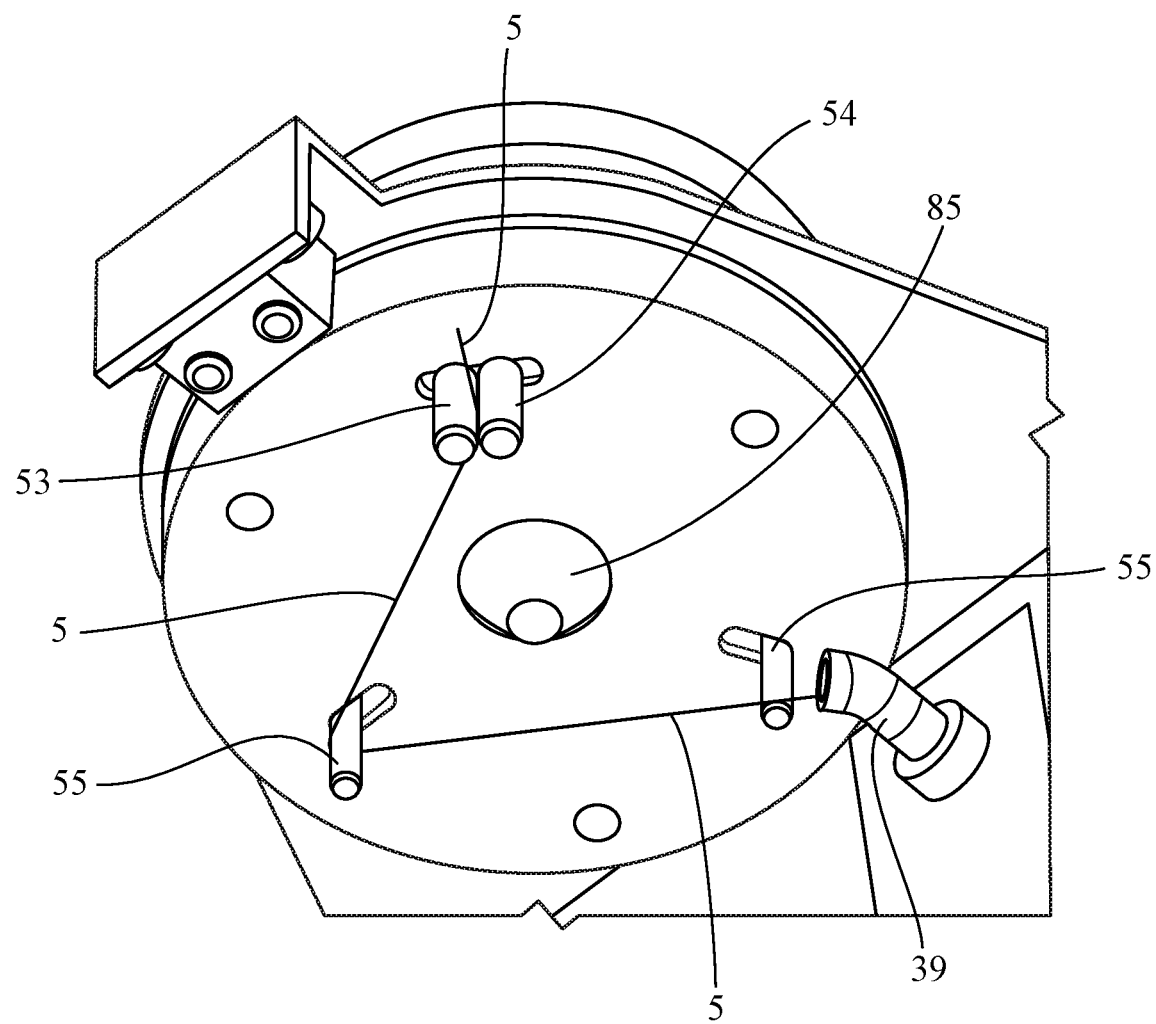
FIG. 10 is another upward perspective view of the spindle assembly further along in its rotational movement.

For example, the spindle assembly 50 of at least one embodiment includes a floss engaging apparatus 52 disposed in a receiving or at least temporarily aligned relation with the dental floss feeding assembly 30 and/or the exit tube 39 thereof. In particular, as the dental floss 5 exits the dental floss feeding assembly 30 or tube 39 and enters the floss dispensing region 15 and/or the spindle assembly 50, the spindle assembly 50 of at least one embodiment will engage or clamp onto a portion of the dental floss 5, e.g., via the floss engaging apparatus 52. In the illustrated embodiments, the floss engaging apparatus 52 includes a pair of movable or clamping pins 53, 54, that are disposable between an open and at least partially separated position (FIG. 7) and an at least partially closed, engaged position (FIGS. 8, 9, and 10). For instance, referring to FIG. 7, arrows A1 and A2 illustrate the direction of travel of the two clamping pins 53, 54, i.e., towards one another in a manner to clamp or engage the dental floss 5.

Particularly, with reference now to FIG. 8, once the dental floss 5 is extracted enough to be engaged by the floss engaging apparatus 50, for example, when the dental floss 5 is at least partially between the two clamping pins 53, 54, the clamping pins 53, 54 or other floss engaging apparatus 52 will close or engage the dental floss 5, as shown in FIG. 8. Once the dental floss 5 is engaged, the spindle assembly 50 may be rotationally or movably disposed, for example, in direction A3. This will cause the dental floss 5 to be further extracted or pulled from tube 39 or cartridge 20, as generally shown in FIG. 9, for example.

Moreover, as shown in FIGS. 7 through 9, in at least one embodiment, the present invention further includes one or more winding pins 55 disposed around or on the spindle 50 and structured to engage or contact the dental floss 5 as the spindle 50 continues to rotate or move, for instance, in direction A3. As represented in FIG. 10, while the spindle 50 rotates, the dental floss 5 remains engaged between the floss engaging apparatus 52, such as clamping pins 53, 54, and will at least partially wrap around, contact or engage the one or more winding pins 55. This further extracts or pulls the dental floss 5 from the dental floss feed assembly 30, such as through the tube 39 and/or from the cartridge 20 (not shown in FIG. 10).

It should be noted that the rollers 33, 34 (FIG. 6) and the spindle 50 (FIGS. 7 through 10) of at least one embodiment may be timed or otherwise correspondingly operated or synchronized such that the dental floss 5 will feed through the roller(s) 33, 34 or dental floss feed assembly 30 at the same rate or speed in which the spindle 50 pulls the dental floss 5. In one exemplary embodiment, the roller(s) 33, 34 may rotate three (3) times each time the spindle 50 rotates one full revolution, and the full length of dental floss 5 dispensed may be four (4) full revolutions or turns of the spindle 50. Of course, other relative rotational speeds and lengths of dental floss 5 may vary depending on preference and/or sizes of the spindle, roller(s), and dispenser 10, and thus, the previously noted relative rotational dimensions are provided for illustrative purposes only and should not be considered limiting.

Figure 12:
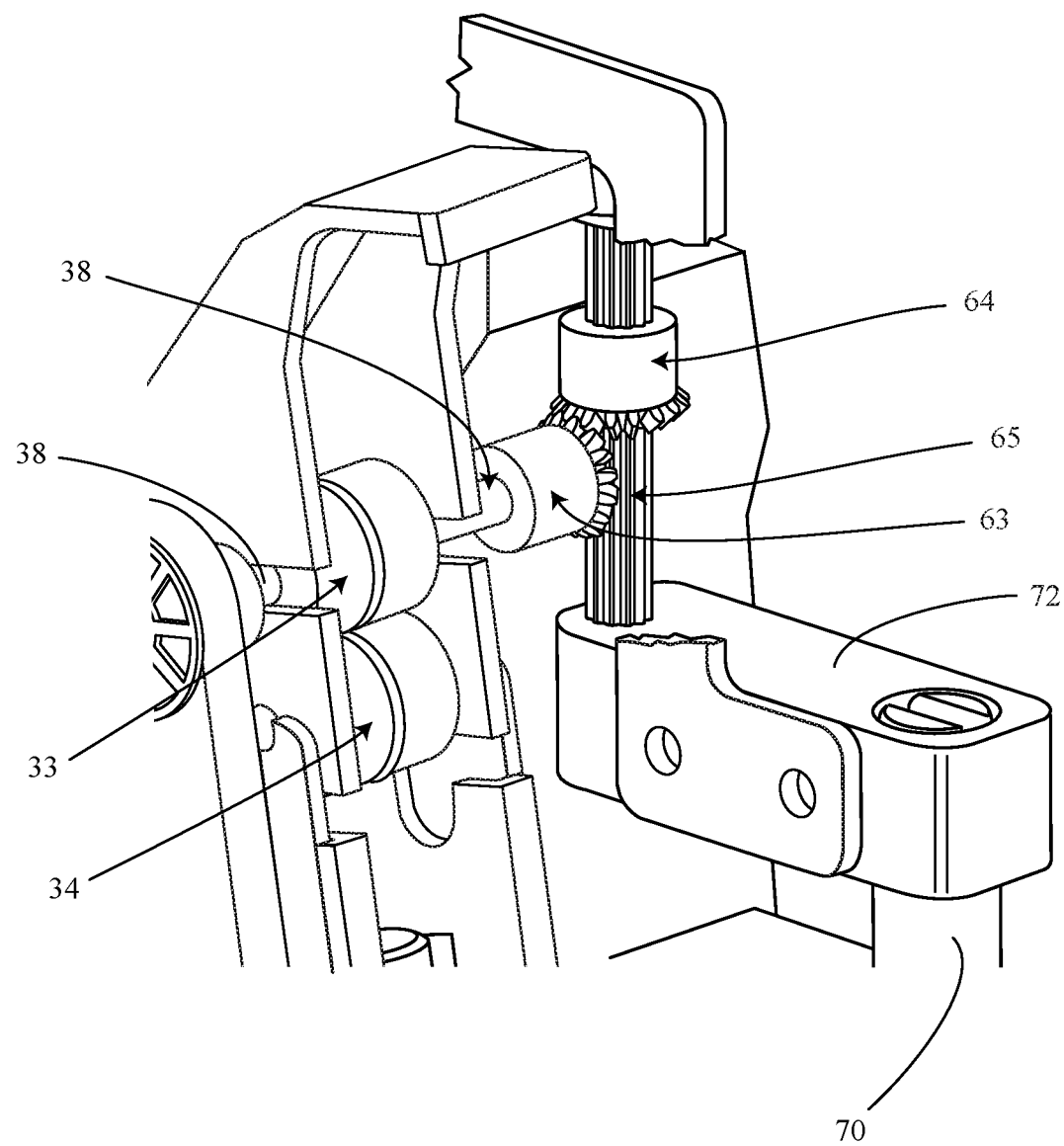
FIG. 12 is another partial internal view of the dispenser assembly illustrating the spindle activation assembly as disclosed in accordance with at least one embodiment of the present invention.

Referring now to FIGS. 11 and 12, the present invention further includes a spindle activation or lift assembly, generally referenced as 60. Specifically, the spindle activation assembly 60 or lift assembly of at least one embodiment is structured to activate the spindle 50, and in particular, open and/close the floss engaging apparatus or clamping pins 53, 54 and/or cause rotational or other movement of the spindle 50 for operation of the present invention, as described herein.

For instance, in one embodiment, as illustrated in FIGS. 11 and 12, the spindle activation assembly 60 or lift assembly includes a gear assembly 62 that is disposed between a disconnected or inactive position (FIG. 11) and an interconnected, activated position (FIG. 12). Particularly, the gear assembly 62 of one embodiment includes a drive gear 63 interconnected in a driving relation to drive shaft 38, and a driven gear 64 that is movably disposed into and out of an engaging or interconnected relation with the drive gear 63. For instance, the driven gear 64 may be interconnected to a shaft 65. As the shaft 65 is moved, the gear 64 will move into and out of the interconnected or driving relation with gear 63.

In one embodiment, the shaft 65 is interconnected to a lift cylinder 70 (either directly or indirectly), for example, via an attachment yolk 72. The lift cylinder 70 may be spring loaded, pneumatic, and/or electrically activated in order to position the yolk 72 and/or the shaft 65 in a movable (e.g., up and down) relation. In the illustrated embodiment, when the lift cylinder 70 pulls downward, the gear assembly 62 is engaged (FIGS. 12 and 13).

For instance, when the gear assembly 62 is engaged (e.g., when the driven gear 64 is engaged with the drive gear 63), rotation of the drive shaft 38 will cause the driven gear 64 and/or shaft 65 to rotate. Shaft 65 and/or gear 64 may be connected to a spindle pulley assembly 73, comprising a spindle drive pulley 74 and a spindle driven pulley 76 interconnected with a pulley belt 75 or other like device. The spindle driven pulley 76 will serve to rotate the spindle 50, as described herein. For example, as the pulley 76 is rotated, the spindle 50 will also rotate in the same manner. Accordingly, in at least one embodiment, the pulley 76 may be connected to the spindle 50 causing a corresponding rotation thereof. Of course, other operational mechanics of the lift assembly 60 and the spindle 50 may be implemented within the full spirit and scope of the present invention.

Figure 13:
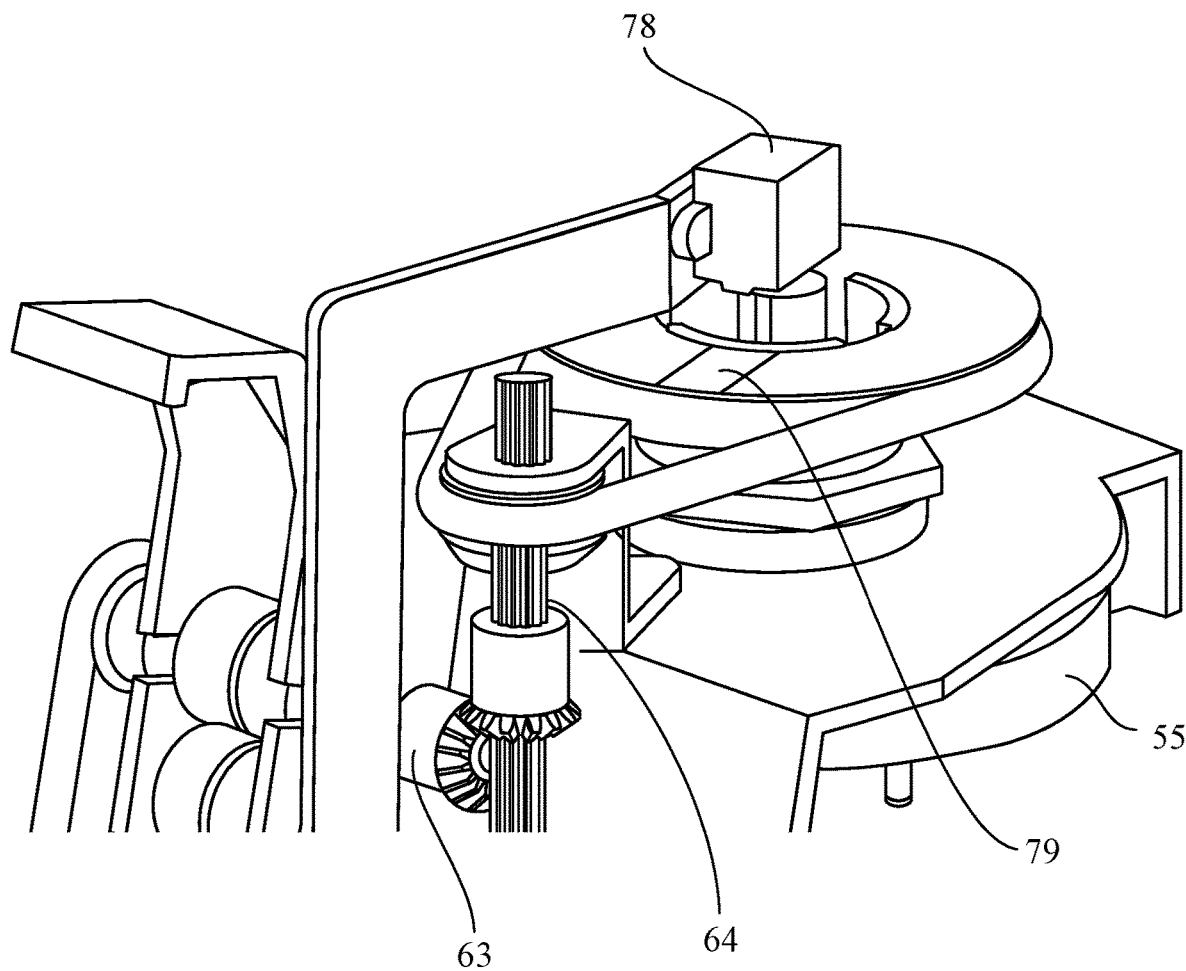
FIG. 13 is a partial internal view of the dispenser assembly illustrating another view of a portion of the spindle activation assembly of at least one embodiment of the present invention.

With reference to FIG. 13, one embodiment may include a sensor 78 and a sensor target 79 for counting the number of times the spindle 50 or pulley 76 rotates, and to signal to a controller (not shown) when to shut off the motor, e.g., when the spindle 50 has rotated enough times (e.g., four) to dispense a desired length of dental floss. In the embodiment illustrated, the sensor target 79 may include a colored stripe or other indicator in the surface of the spindle driven pulley 76 and the sensor 78 may be disposed proximate the surface of the spindle driven pulley 76 in order to detect and count the number of times the sensor target 79 has passed or reached the sensor 78. Of course, other sensors, targets and locations for detecting or counting the revolutions of the spindle 50 are contemplated within the full spirit and scope of the present invention.

Referring again to FIG. 11, the spindle activation assembly 60 or lift assembly of at least one embodiment further includes a pin positioning assembly 80 for selectively and cooperatively positioning the clamping pin(s) 53, 54 and/or winding pin(s) 55 of the spindle assembly 50, as described herein. For instance, in one implementation, the spindle activation assembly 60 includes a cam arm 82 that is movable, for example, in an up and down relation. In one embodiment, the cam arm 82 is interconnected between the pin positioning assembly 80 and the yoke 72, or otherwise between the pin positioning assembly 80 and the lift cylinder 70. In this manner, the cam arm 82 is movable (e.g., up and down) with the yoke 72, for example, as the lift cylinder 70 moves the yoke 72. Thus, when the gear assembly 62 is engaged, for example, when the lift cylinder 70 pulls downward on the yoke 72, the cam arm 82 will also move downward, thereby pushing or moving the pin positioning assembly 80 downward.

Figure 14A:
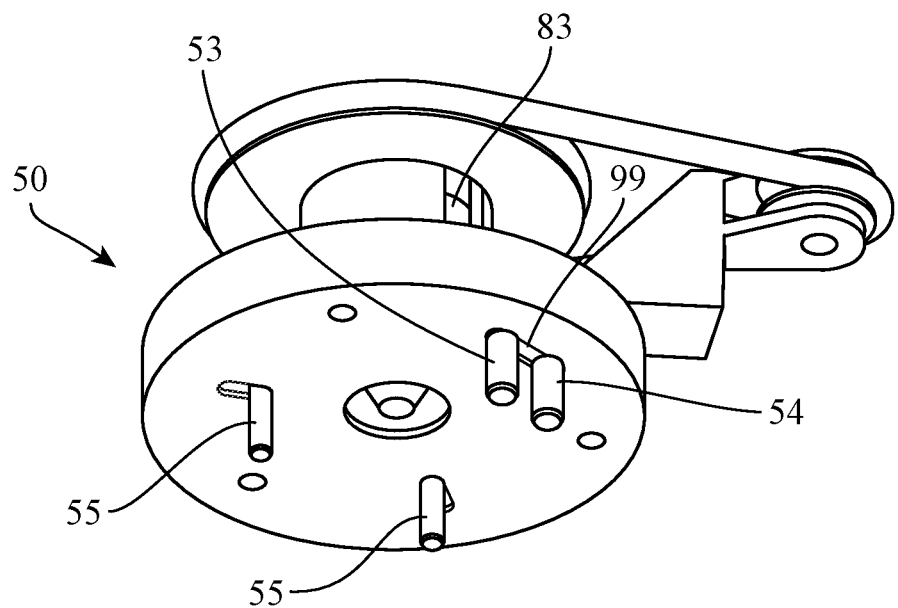
FIG. 14A is a bottom perspective view of the spindle assembly and a portion of the spindle activation assembly of at least one embodiment of the present invention.
Figure 14B:
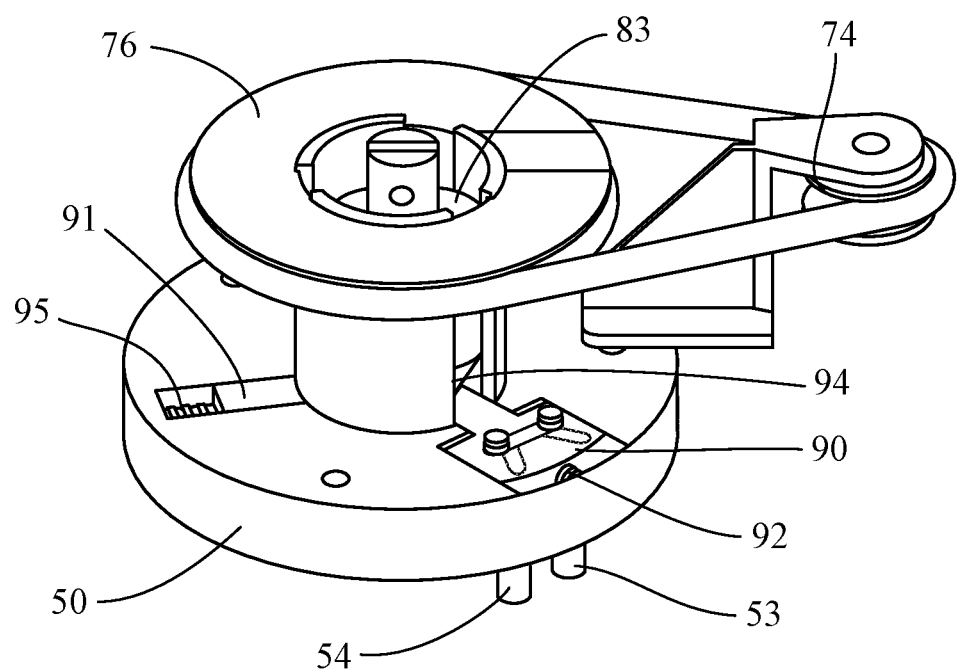
FIG. 14B is a top perspective, partially transparent view of the spindle assembly and a portion of the spindle activation assembly of at least one embodiment of the present invention.
Figure 14C:
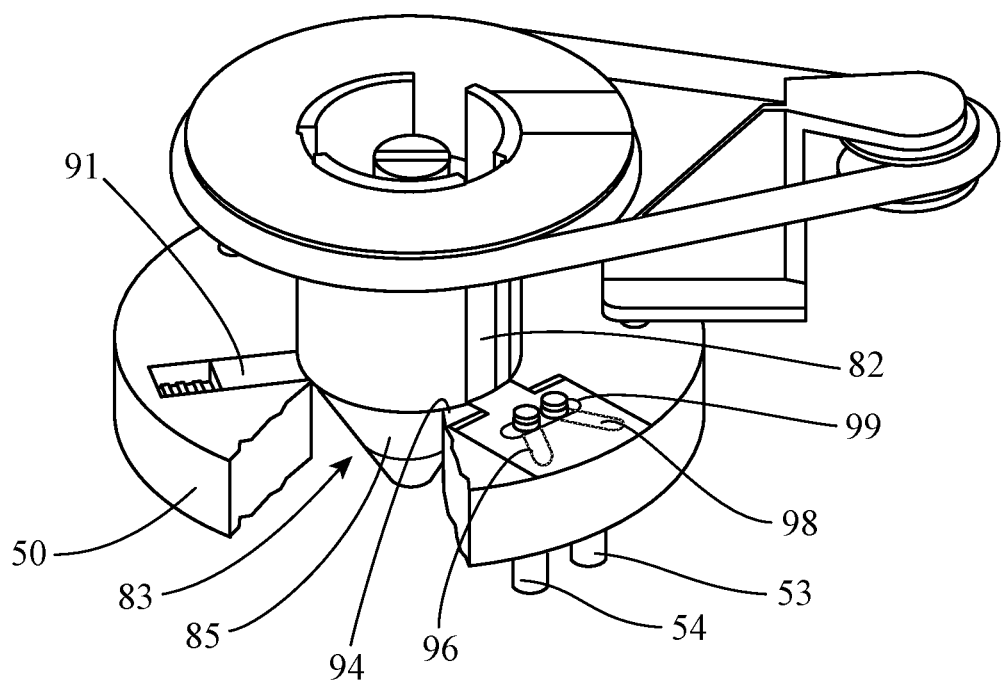
FIG. 14C is another top perspective, partially transparent view of the spindle assembly and a portion of the spindle activation assembly of at least one embodiment of the present invention.

Referring now to FIGS. 14A, 14B and 14C, the pin positioning assembly 80 of at least one embodiment includes a vertical or movable cam 83 interconnected to the cam arm 82 (not shown in FIGS. 14A through 14C). The movable cam 83 is movable relative to the spindle assembly 50, for example, in an up and down or vertical manner through a center bore thereof. As the movable cam 83 moves through the bore or otherwise relative to the spindle 50, the pins, e.g., the clamping pins 53, 54 and/or the winding pins 55 are movably disposed thereby. For instance, as shown in FIG. 14B, the pin positioning assembly 80 of at least one embodiment includes a clamp pin holder 90 disposed within the spindle housing and biased within the spindle housing by virtue of a biasing mechanism such as a spring 92. In this manner, the clamp pin holder 90 is movably disposed within the spindle housing, for example, inward toward the center or toward the movable cam 83, and outward or toward the outer edge of the spindle housing, e.g., in a direction away from the movable cam 83. In the embodiment shown, the biasing mechanism 92 normally biases the clamp pin housing 90 inward. When the movable cam 83 moves, for example, in a downward direction (e.g., when the lift cylinder 70 pulls the cam arm 82 downward (FIGS. 11-13), the clamp pin holder 90 is forced outward.

For instance, referring to FIGS. 14B and 14C, the clamp pin holder 90 of at least one embodiment includes an angled contact surface 94 disposed in an engaging relation with a corresponding angled surface 85 of the movable cam 83. In the illustrated embodiment, the angled surface 85 of the cam 83 is somewhat conical or slanted, and tapers downward such that the upper surface is wider than the lower surface. The contact surface 94 of the clamp pin holder 90 mates with the conical or slanted/angled surface 85 of the cam 83, such that the lower edge of the contact surface 94 extends further inward than the upper edge. In this manner, when the cam 83 is moved downward, e.g., through the bore, the corresponding angled surfaces 85, 94 cause the clamp pin holder 90 to push against the biasing spring 92 and move in a general outward direction.

Furthermore, as shown in FIG. 14C, the clamp pin holder 90 includes outwardly diverging channels 96, 98 through which the pair of clamp pins 53, 54 are disposed or positioned, and the housing or spindle 50 includes a straight positioning channel 99. As the clamp pin housing 90 moves from an outward position (FIG. 14B) to an inward position (FIG. 14C) (e.g., as the cam 83 is moved down through the bore), the clamp pins 53, 54 will travel along the outwardly diverging (or inwardly converging) channels 96, 98 toward one another, while remaining within the straight channel 99. This forces the clamp pins 53, 54 to be disposed in the clamped or engaging relation. Similarly, as the clamp pin housing 90 moves from an inward position to an outward position (e.g., as the cam 83 moves upward through the bore), the pins 53, 54 will travel along channels 96, 98 while remaining within the channel 99, thereby separating from one another.

In some embodiments, the winding pin(s) 55 may also be movable, for example, within or relative to the spindle housing. However, the winding pin(s) 55 may move in a linear inward/outward direction for example toward and away from the cam 83. In at least one embodiment, this movement of the winding pin(s) 55 is accomplished via cooperative angled contact surfaces 93 of winding pin holder(s) 91, similar to the angled contact surface 94 of the clamp pin holder 90. Also, the winding pin holder(s) 91 may be normally biased inward, for example, via a biasing mechanism or spring 95. Movement of the cam 83, therefore, causes the winding pin holder(s) 91 to move within a channel inward and outward. The inward movement of the winding pins 55 may be used to assist in the release of the dental floss 5 after it has been wound around the winding pin(s) 55 and/or clamp pins 53, 54 and/or otherwise extracted from the cartridge 20 or other source.

Figure 15A:
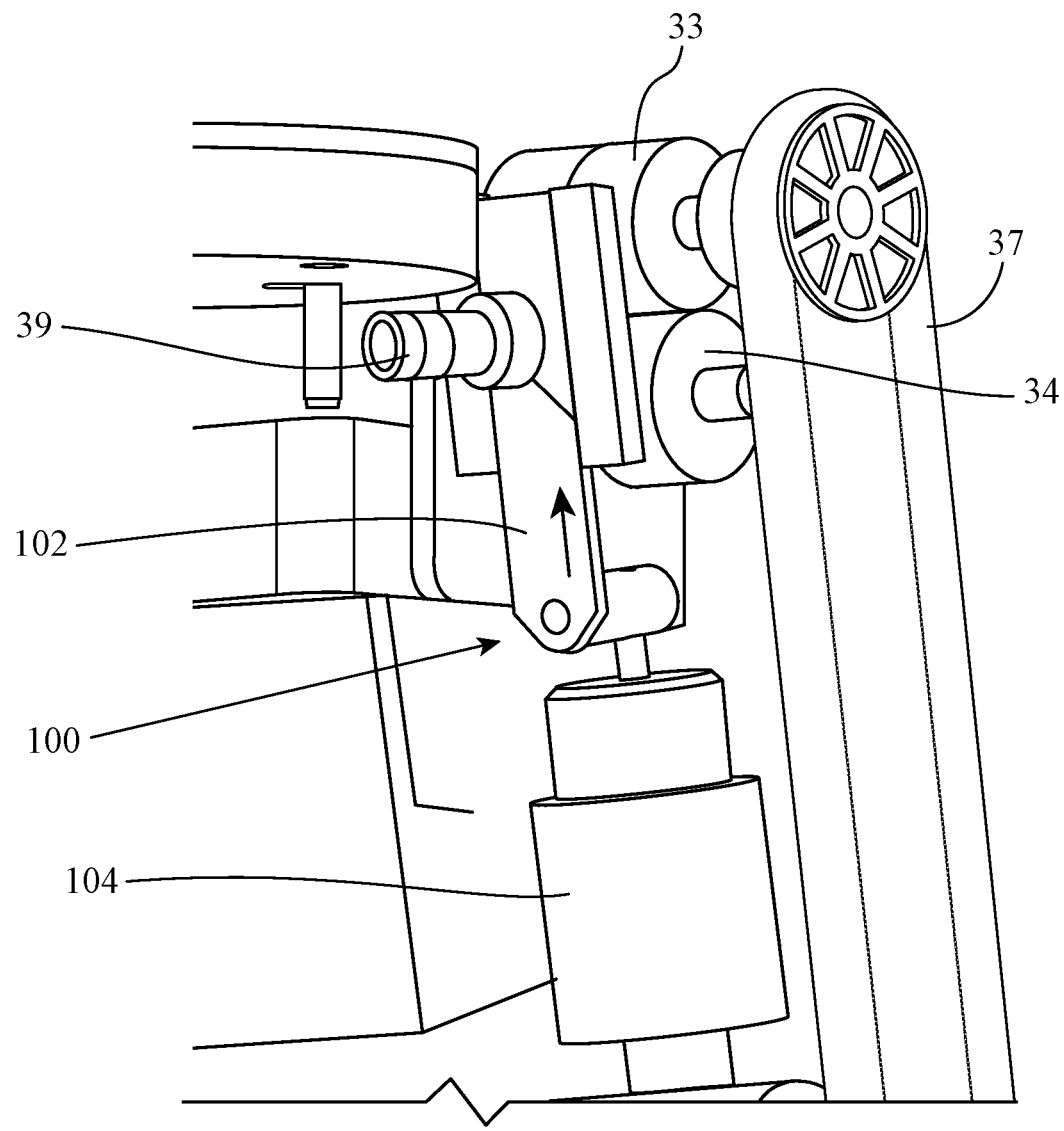
FIG. 15A is a partial internal view of the dispenser assembly illustrating the cut-off assembly of at least one embodiment of the present invention.
Figure 15B:
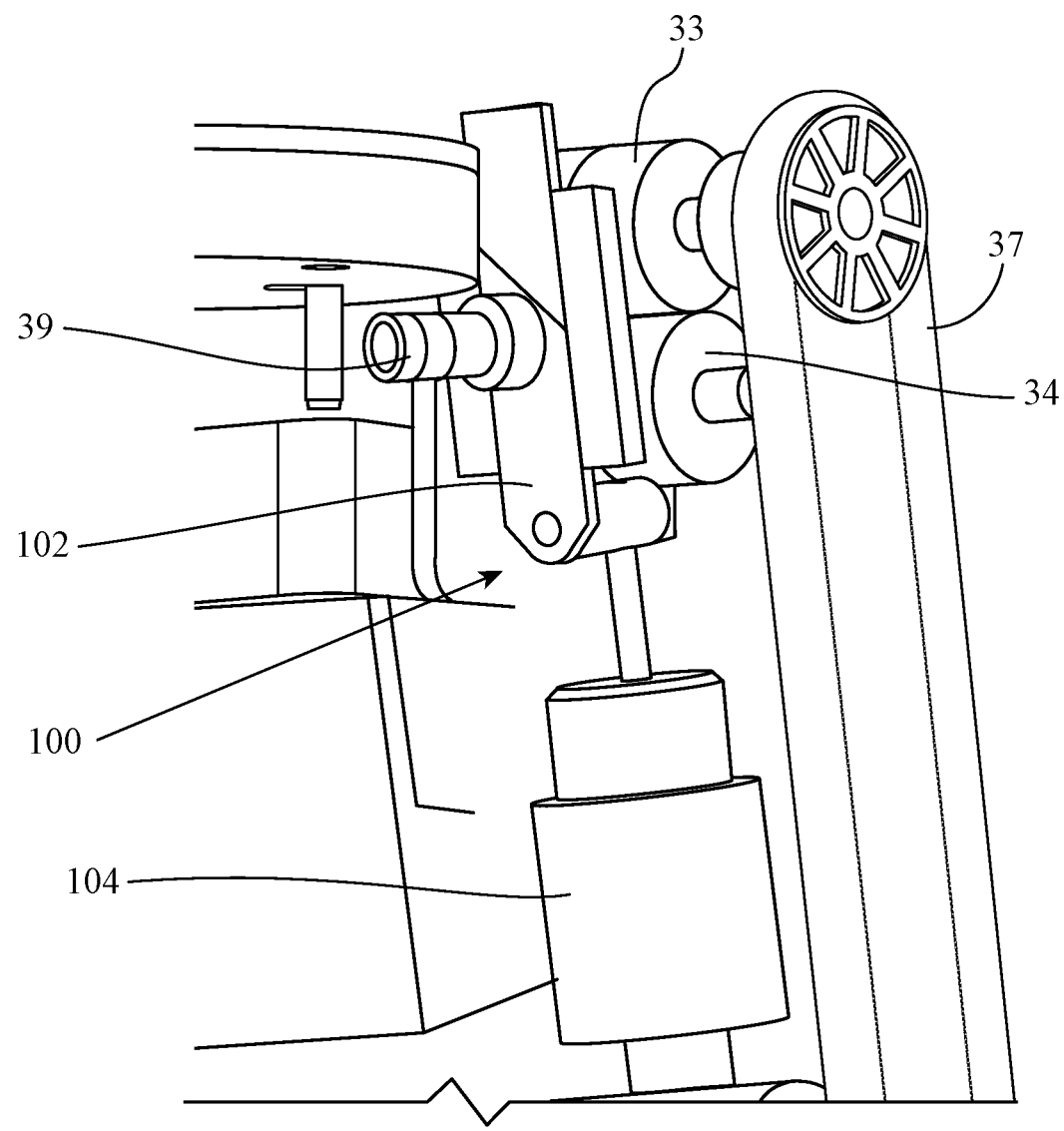
FIG. 15B is another partial internal view of the dispenser assembly illustrating the cut-off assembly of at least one embodiment of the present invention.

Referring now to FIGS. 15A and 15B, at least one embodiment of the present invention further includes a cut-off assembly 100 structured and disposed to cut the dental floss when it is ready to be dispensed. For example, as shown in FIGS. 15A and 15B, the cut-off assembly 100 may be positioned between the rollers 33, 34 of the dental floss feed assembly and the tube 39 which feeds the dental floss into the dispensing assembly or spindle 50. FIG. 15A illustrates a cut-off blade 102 disposed in a retracted position allowing the dental floss (not shown) to pass through the dental floss feed assembly, through the tube 39 and into the spindle. After the floss is fully fed and the spindle has stopped, a cut-off cylinder 104 may be activated causing the cut-off blade to pass through the dental floss and cut the dental floss. FIG. 15B shows the cut-off blade in the activated position. The cylinder 104 may be spring loaded in the retracted position and electrically activated in the extended position. After the dental floss is cut, the lift cylinder 70 (FIG. 10) raises up, thereby disengaging the gear assembly 32 and opening the clamp pins 53, 54 and winding pins 55.

Referring back to FIG. 9, in at least one embodiment, a motion sensor 110 may be included and aimed or directed into the floss dispensing region 15 in order to detect the presence of a hand or other object. This can signal the activation of the dispenser 10 causing the dental floss to be extracted from the cartridge, disposed through the dental floss feed assembly and into the spindle as described herein.

Particularly, in at least one exemplary embodiment, in operation, upon activation of the dispenser 10 of the present invention (e.g., via detection of a hand within the floss dispensing region 15, activation of a button, or otherwise), the motor 31 may activate or turn on long enough to feed the dental floss 5 into or between the clamp pins 53, 54 (which are initially disposed in the separated position). The initial activation may be for one (1) revolution of the roller(s) 33, 34 or other amount. Once the dental floss 5 is in position (e.g., between the clamp pins 53, 54), the lift cylinder 70 will pull down in order to engage the gear assembly 32 and close the clamp pins 53, 54 as described herein. The motor 31 will then reactivate or turn back on. This will not only continue to feed the dental floss through the rollers 33, 34, but since the gear assembly 32 is now engaged, the drive shaft 38 will also serve to rotate the spindle 50. Also, since the clamp pins 53, 54 are now engaged or clamped, the dental floss 5 will be engaged there between and wrap at least partially around the winding pin(s) 55 as the spindle 50 rotates. After sufficient time or rotation (e.g., after four (4) turns of the spindle 50) the motor 31 is deactivated or turned off. The cut-off assembly 100 is then activated, for example, by virtue of the cut-off cylinder 104 moving the cut-off blade 102 through the dental floss. The operator will then place his or her hand under the sensor 110, the lift cylinder will then return to the home position, releasing the clamp pins 53, 54 and the opening or disengaging the gear assembly 32. With the clamp pins 53, 54 opened, the dental floss will fall by virtue of gravity, allowing the dental floss 5 to fall into the user's hand.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A dental floss dispenser, comprising:
a housing and an activation sensor,
a dental floss feeding assembly disposed at least partially within said housing,
a dispensing assembly structured to receive an amount of dental floss from said dental floss feeding assembly,
said dental floss feeding assembly comprising a cartridge structured to at least temporarily retain dental floss therein, said cartridge comprising an outlet through which the dental floss is extracted into the feeding assembly,
said dispensing assembly comprising a spindle assembly and a spindle activation assembly, wherein the amount of dental floss is fed from said dental floss feeding assembly to said spindle assembly for dispensing; wherein said dental floss feeding assembly further comprises a motor disposed in driving relation to an extraction assembly, said extraction assembly being structured to extract the dental floss from said cartridge; wherein said spindle assembly comprises a floss engaging apparatus disposed in a floss receiving relation with said dental floss feeding assembly, said floss engaging apparatus being structure to at least temporarily engage the dental floss fed from said dental floss feeding assembly; wherein said floss engaging apparatus comprises a pair of movable pins disposable between an open, separated position and a closed, engaging position; wherein at least a portion of said spindle assembly is movable in a rotational manner for further extracting the dental floss from said cartridge; wherein said spindle assembly further comprises at least one winding pin structured to at least partially contact the dental floss as said spindle assembly rotates; wherein said spindle activation assembly comprises a gear assembly disposable between an interconnected, activated position and a disconnected, inactive position; wherein said spindle assembly is at least partially driven in said rotational manner when said gear assembly is disposed in said interconnected, activated position; wherein said spindle activation assembly further comprises a cam arm interconnected with a pin positioning assembly, said pin positioning assembly being structured to selectively position said pair of movable pins between said open, separated position and said closed, engaging position; wherein said cam arm is interconnected to a common yoke with a lift shaft, said yoke being movably disposed by a lift cylinder.

2. The dental floss dispenser as recited in claim 1 wherein said extraction assembly comprises a pair of rollers closely arranged with parallel axes of rotation, wherein the dental floss is fed between said pair of rollers for extraction from said cartridge.

3. The dental floss dispenser as recited in claim 2 wherein at least one of said pair of rollers is rotationally driven by said motor about a drive shaft.

4. The dental floss dispenser as recited in claim 1 wherein said pin positioning assembly comprises a movable cam interconnected to said cam arm, said movable cam being movably disposed when said cam arm and said yolk are moved.

5. The dental floss dispenser as recited in claim 1 wherein said pin positioning assembly comprises at least one clamp pin holder, said clamp pin holder comprising two diverging channels through which said pair of movable pins are disposed, wherein an outward movement of said clamp pin holder causes said pair of clamp pins to be disposed in said open, separated position, and wherein an inward movement of said clamp pin holder causes said pair of clamp pins to be disposed in said closed, engaging position.

* * * * *